US012745298B2

(12) United States Patent
Mitty et al.

(10) Patent No.: US 12,745,298 B2
(45) Date of Patent: Sep. 22, 2026

(54) METHODS AND DEVICES TO ESTABLISH AND MAINTAIN CONNECTIONS WITH MULTIPLE COMMUNICATION DEVICES

(71) Applicant: Intel Corporation, Santa Clara, CA (US)

(72) Inventors: Harish Mitty, Bangalore (IN); Anand Venkitasubramani, Bangalore (IN); Satish G.U., Bangalore (IN); Abhijeet Prabhakar Palnitkar, Bangalore (IN); Balvinder Pal Singh, Bhilai (IN)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 18/161,894

(22) Filed: Jan. 31, 2023

(65) Prior Publication Data

US 2023/0309163 A1 Sep. 28, 2023

(30) Foreign Application Priority Data

Mar. 22, 2022 (EP) .................................... 22163543

(51) Int. Cl.
*H04W 76/14* (2018.01)
*H04W 84/12* (2009.01)

(52) U.S. Cl.
CPC ............ *H04W 76/14* (2018.02); *H04W 84/12* (2013.01)

(58) Field of Classification Search
CPC ....... H04W 4/80; H04W 48/16; H04W 84/20; H04W 76/14; H04W 84/12; H04W 4/70; Y02D 30/70; H04L 67/12; H04L 67/63; H04L 65/1069; H04L 67/56
See application file for complete search history.

(56) References Cited

U.S. PATENT DOCUMENTS 10,009,862 B1 * 6/2018 Malovany ........... H04W 56/001
12,156,282 B2 * 11/2024 Mourad .................. H04W 4/80
2002/0055978 A1 * 5/2002 Joon-Bo ............... H04W 84/20 709/209
2005/0086273 A1 * 4/2005 Loebbert ............... H04W 84/20
2006/0244624 A1 * 11/2006 Wang ..................... H05B 47/19 340/815.67

(Continued)

OTHER PUBLICATIONS

Eurpoean Office Action for corresponding European patent application No. 22163543.6, dated Jul. 18, 2024, 9 pages (for informational purposes only).

(Continued)

*Primary Examiner* — Cindy Trandai
(74) *Attorney, Agent, or Firm* — Viering, Jentschura & Partner mbB

(57) ABSTRACT

A communication device may include a processor configured to establish a connection with one or more peripheral devices in response to a disconnection from an external communication device, determine that the external communication device is connectable based on radio communication signals received from the external communication device, and encode a message to be transmitted to the one or more peripheral devices in response to the determination that the external communication device is connectable, wherein the message is configured to cause the one or more peripheral devices to perform a high duty cycle advertising in accordance with a Bluetooth communication protocol.

20 Claims, 14 Drawing Sheets

(56) References Cited

U.S. PATENT DOCUMENTS

2010/0304674 A1* 12/2010 Kim ...................... H04W 76/10 455/41.2
2013/0148558 A1* 6/2013 Malladi .................... H04B 7/26 370/311
2013/0155925 A1* 6/2013 Priyantha .......... H04W 52/0245 370/311
2013/0298208 A1* 11/2013 Ayed ....................... G06F 21/43 375/259
2013/0344812 A1* 12/2013 Dees ..................... H04W 12/04 455/41.2
2014/0094123 A1* 4/2014 Polo .................. H04W 52/0216 455/41.2
2015/0016417 A1 1/2015 Dees et al.
2015/0179044 A1* 6/2015 Wu ......................... G01M 3/18 340/605
2015/0351084 A1* 12/2015 Werb .................. H04W 12/033 370/329
2015/0358505 A1* 12/2015 Diaz .................. H04N 1/00209 358/1.14
2016/0117268 A1 4/2016 Griffin
2016/0150501 A1* 5/2016 Hui ......................... H04W 4/06 370/254
2016/0174266 A1* 6/2016 Goel ....................... H04W 4/70 455/509
2016/0234371 A1 8/2016 Kang
2017/0056677 A1* 3/2017 Zhang .................... A61B 5/686
2018/0213349 A1* 7/2018 Panje .................... H04L 12/283
2018/0247472 A1 8/2018 Odejerte, Jr. et al.
2020/0314590 A1* 10/2020 Odejerte, Jr. ........... G01S 11/06
2020/0356509 A1 11/2020 Gosselin

OTHER PUBLICATIONS

Bluetooth Core Specification v 5.0, Covered Core Package Version: 5.0, Publication Date: Dec. 6, 2016, 2816 pages (Informational purposes only).
The extended European Search Report for European Patent Application No. 22163543.6, dated Jul. 15, 2022, 12 pages (Informational purposes only).

* cited by examiner

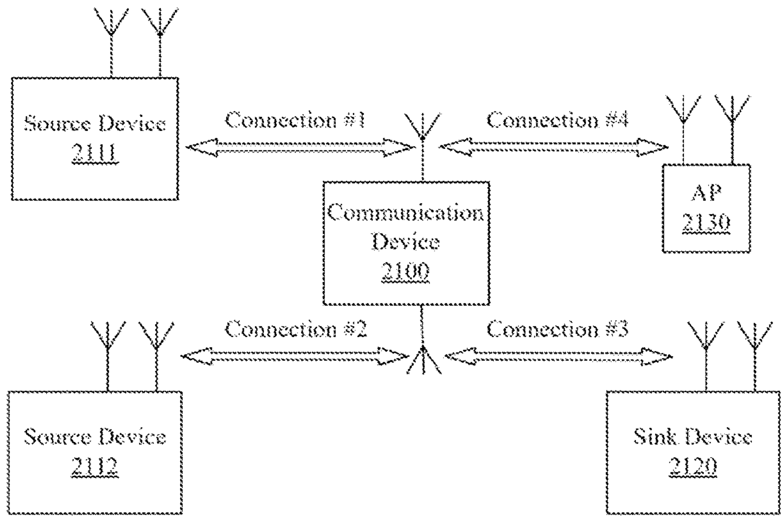
FIG. 21
FIG. 22
AP | AP | P2P #1 | AP | P2P #2 | P2P #1 | AP | AP | AP | AP | P2P #3 | P2P #3 | P2P #3 | AP | AP | AP
2300
FIG. 23

METHODS AND DEVICES TO ESTABLISH AND MAINTAIN CONNECTIONS WITH MULTIPLE COMMUNICATION DEVICES

CROSS-REFERENCE TO RELATED APPLICATIONS

This US Application claims priority to European patent application EP22163543.6, filed on Mar. 22, 2022, the entirety of which is fully incorporated herein by reference.

TECHNICAL FIELD

This disclosure generally relates to methods and devices to establish and maintain connections with multiple communication devices.

BACKGROUND

Many wireless communication technologies, in particular, short-range wireless communication technologies may allow direct communication between two communication devices without the involvement of an intermediate centralized entity controlling various aspects of the communication. Considering the increased number of communication devices configured to communicate according to short-range wireless communication protocols, a communication device may use direct connections to receive and/or provide various types of services from/to another communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 21 shows an example of a communication system;

FIG. 22 shows an exemplary illustration with respect to a communication system;

FIG. 23 shows an exemplary allocation of time slots to communicate via multiple connections in a communication system;

DESCRIPTION

Figure 1:
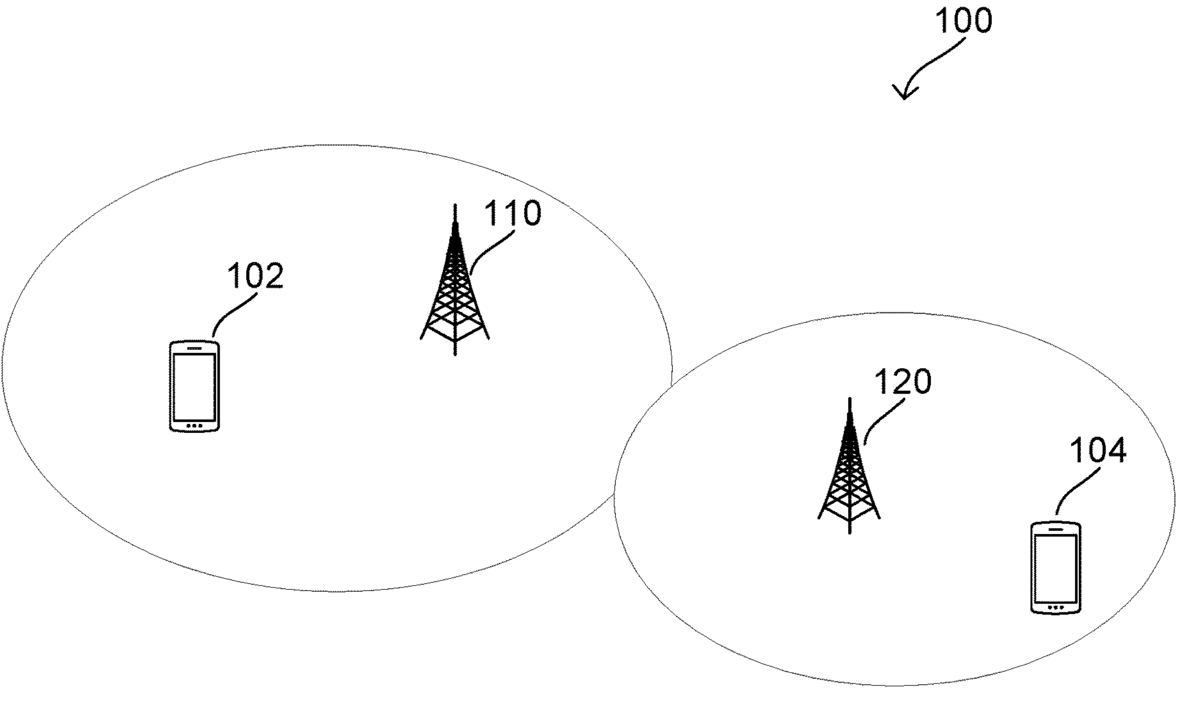
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

As used herein, "communication device" may refer to any type of electronic devices that are able to exchange information with at least another device, for example according to various types of radio communication technologies and using various types of communication protocols as exemplarily provided herein. Exemplarily, a communication device may be, or may include, an access point, a station, any types of user devices which may include a suitable device including a processor, that may include, a mobile device or a non-mobile device, a user equipment (UE), a computing device, such as a personal computer (PC), a desktop computer, a mobile computer, a laptop computer, a notebook computer, a tablet computer, a server, a handheld computing device, a wearable device, such as a smart bracelet, a smart watch, smart glasses, a smart ring, etc., an internet of things (IoT) device, a sensor, a mobile phone, a cellular telephone, any types of wireless accessories, such as a headphone, a headset, a microphone, a speaker, a domotics (smart home) device, a docking station etc.

As used herein, the term "duty cycle" may refer to a fraction of one period of time in which a signal or a system is active. For example, a duty cycle may include a cycle defined by an inactive period and an active period. The corresponding entity may transmit and/or receive communication signals in the active period. The corresponding entity do not transmit and/or receive communication signals in the inactive period. The corresponding entity may have circuitries to transmit and/or receive communication signals and at least one of the circuitries may operate in low power mode during the inactive period.

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies including Wireless Personal Area Network (WPAN) standards (e.g., according to any IEEE 802.15 standard), Wi-Fi Direct, Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Bluetooth (BT) technology may use frequencies between 2.402 and 2.480 GHz, or 2.400 and 2.4835 GHz including guard bands 2 MHz wide at the bottom end and 3.5 MHz wide at the top, according to frequency-hopping spread spectrum. A communication device operating according to a Bluetooth protocol may divide data to be transmitted into packets, and transmit each packet into a channel designated for the use (e.g. of bandwidth of 1 MHz for classic Bluetooth and 2 MHz for Bluetooth Low Energy (BLE)). A communication device configured to operate according to a Bluetooth protocol may operate in a basic rate (BR) mode using a Gaussian frequency-shift keying (GFSK) modulation, and/or operate in an enhanced data rate (EDR) mode, that is considered to provide a faster data rate and lower power consumption, using a differential phase-shift keying (DPSK) (e.g. 8-DPSK) and/or differential quadrature phase-shift keying (DQPSK) (e.g. it/4-DQPSK) based on the quality of the communication channel. A communication device configured to operate according to a Bluetooth protocol may operate according to the Bluetooth Low Energy (BLE) technology that is integrated within the Bluetooth standard starting from v4.0, which operates within the same frequency spectrum, using GFSK modulation.

Wi-Fi Direct technology, which may also be referred to as Wi-Fi P2P, may be one of the exemplary technologies used with respect to peer-to-peer connections provided in this disclosure. Peer-to-peer connections may refer to point-to-point connections between two communication devices according to a peer-to-peer communication protocols. Within a peer-to-peer network, communication devices (two or more than two) may communicate with each other over the P2P connections established between them. A Wi-Fi Direct connection may allow communication devices to communicate over an established Wi-Fi Direct connection without an intermediary entity such as an access point or a router. Wi-Fi Direct technology allows forming a P2P network by forming a P2P group in which a communication device may take a role as a Group Owner (GO) or a Group Client (GC).

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

In accordance with various aspects of this disclosure, when a central device disconnects from peripheral devices, a communication device may establish connections with the peripheral devices and configure the connections in-between to perform low duty cycle communication operations in order to conserve power. The communication device may further detect that the central device is connectable, and the communication device may configure the peripheral devices to connect back to the central device using high duty cycle communication operations. In various examples, the communication device may be a docking station configured to communicate with the peripheral devices and the central device using BLE technology.

In accordance with various aspects of this disclosure, a communication device may perform application-based offload of data traffic to one or more external communication devices. The communication device may communicate with the one or more external communication devices to exchange data with respect to one or more applications over established connections, and the one or more external communication devices may transmit and/or receive communication signals with respect to the one or more applications to/from further communication devices with respect to the one or more applications, with which the communication device intends to communicate for the one or more applications. In various examples, the communication device may perform communications with one or more external communication devices, and possibly with an access node, using time multiplexing.

In accordance with various aspects of this disclosure, a communication device may combine screen capture videos obtained from screen mirroring data streams of multiple source devices to obtain a combined screen capture video. Furthermore, the communication device may receive information with respect to an interaction with one of the screen capture videos and send instructions to the source device that provided the respective screen capture video. In various examples, the communication device may be an intermediary device between the source devices and a sink device. In various examples, the communication device may be a sink device. The communication device may further be equipped with an eye-tracking sensor and adjust the size of each of the screen capture videos within the combined screen capture video based on received eye-tracking sensor data.

Figure 2:
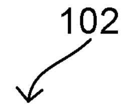
FIG. 2 shows an exemplary internal configuration of a communication device.
Figure 2:
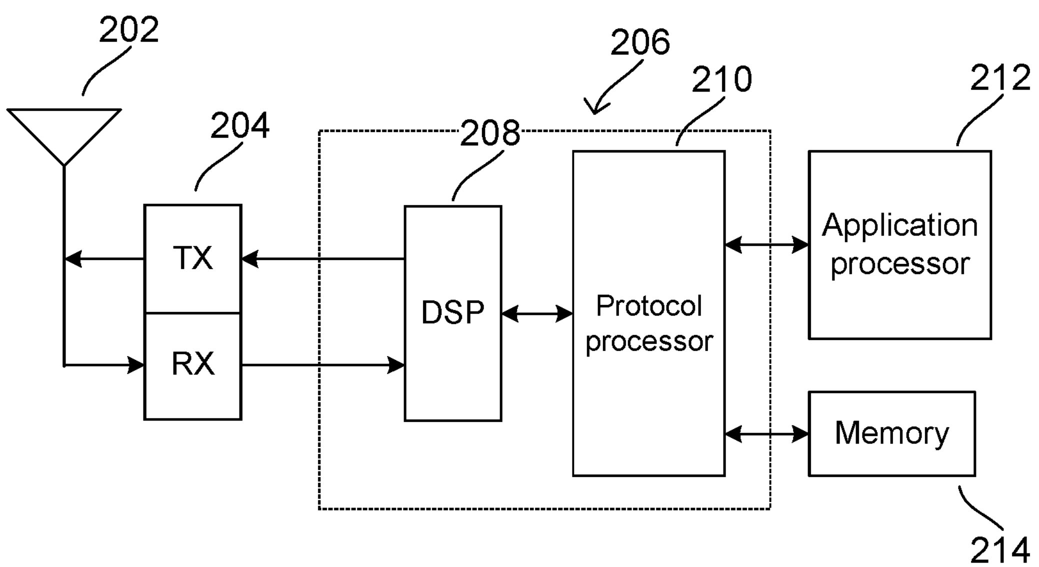

FIGS. 1 and 2 depict a general network and device architecture for wireless communications. In particular, FIG. 1 shows exemplary radio communication network 100 according to some aspects, which may include communication devices depicted as terminal devices 102 and 104 and communication devices depicted as network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount. In various examples, terminal devices 102 and 104 may communicate with each other without involvement of the radio access network, such as over a peer to peer network.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device. The communication device may include a terminal device 102 according to some aspects, and it will be referred to as terminal device 102, but the communication device may also include various aspects of network access nodes 110, 120 as well. The terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112.

Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
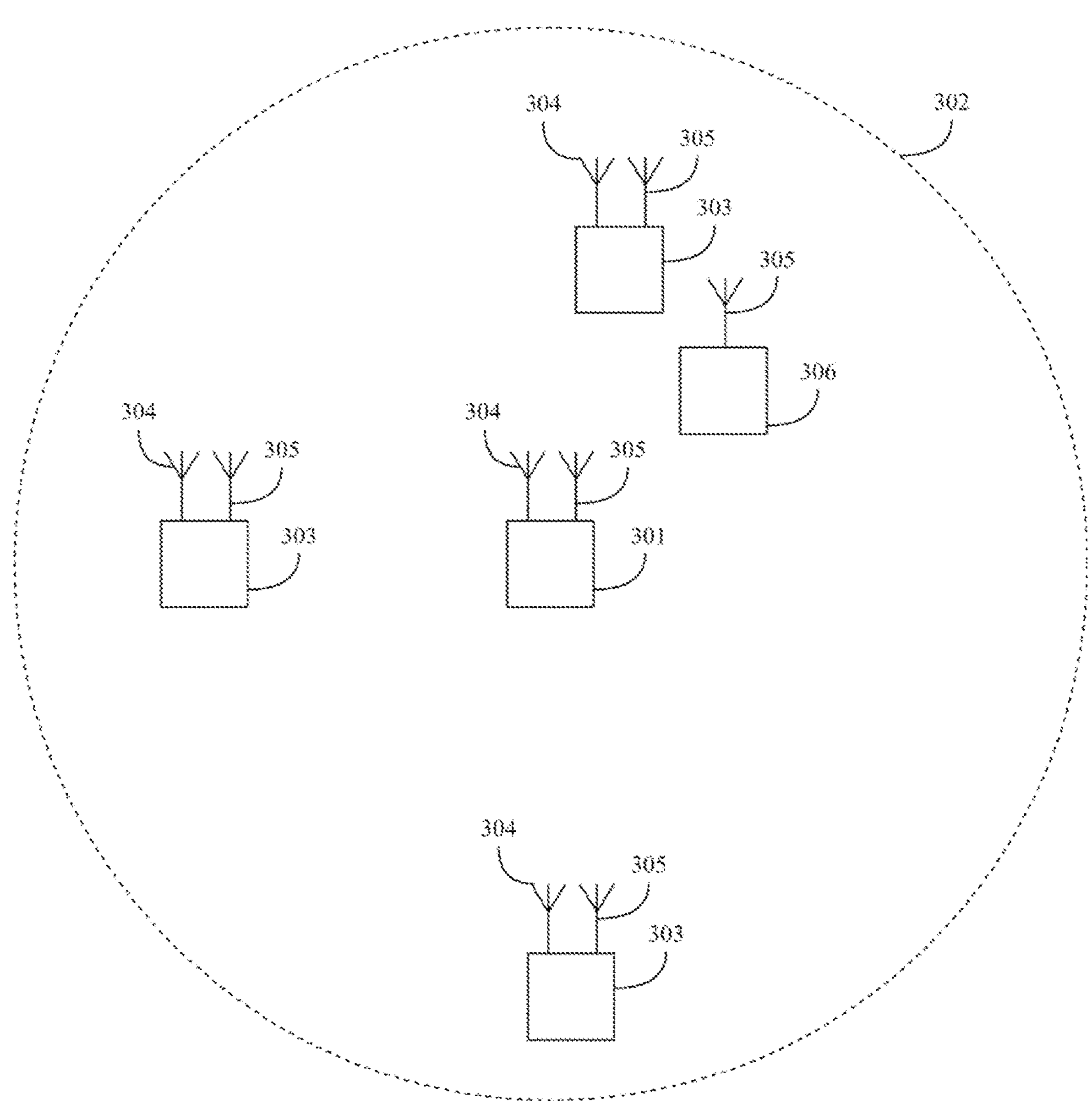
FIG. 3 shows an exemplary illustration of a network environment including various types of communication devices in accordance with various aspects of this disclosure.

FIG. 3 shows an exemplary illustration of a network environment including various types of communication devices in accordance with various aspects of this disclosure. The network environment is depicted to include various types of wireless communication devices configured to communicate with radio communication signals in the network. The network 300 may include a communication device 301 that is couplable to various types of communication devices 303 within a coverage area 302 using one or more communication technologies. In various examples, the communication device 301 may communicate with the further communication devices 303 using radio communication. For this purpose, the communication device 301 may communicate using radio communication signals within a certain range 302. Furthermore, the communication device 301 may also communicate with some of the further communication devices 303 via wired communication, for example, according to a wired communication protocol.

In various examples, the communication device 301 may communicate with at least some of the further communication devices 303 within the network that is configured as a peer-to-peer (P2P) network over established connections between communication devices in the network. For example, the communication device 301 may be communicatively coupled to each of the further communication devices 303. In various examples, the communication device 301 may perform communication with at least some of the further communication devices 303 according to a client-server based model. In a client-server based model, the roles that are assigned for each connection between the communication device 301 and a respective further communication device 303 may vary. The communication device 301 may take a role of a client device or a server device for each connection. Similarly, each of the further communication devices 303 may take a role of a client device or a server device for each connection. In various examples, the communication device 301 may be an access point providing network access to the further communication devices 303.

Communication devices 301, 303 within the network may include various circuits and components configured to receive and transmit communication signals. In various examples, communication devices 301, 303 within the network may communicate according to a wireless radio communication technology (e.g. WLAN, Bluetooth) using one or more antennas 304, 305. In various examples, communication devices 301, 303 within the network may communicate according to multiple communication protocols, or multiple communication technologies. It is depicted in this example that each antenna 304, 305 as a single antenna but this may not be limiting. The antennas 304, 305 may be designated to have only one antenna for both communication technologies. Each antenna 304, 305 or at least one of the antennas 304, 305 may include a plurality of antennas configured to operate in a complementary manner to support multiple antenna technologies, such as maximum ratio combining, beamforming, etc. Communication devices 303, 306 may include further antennas that are designated to be used for further radio communication technologies that a respective communication device may be configured to operate.

In accordance with various aspects of this disclosure, a communication device may communicate with one or more further communication devices over one or more established radio connections, and the connections established between the communication device and further communication devices may be ceased by various reasons, such as a communication device switching to a low-power operation mode in which the communication device may disconnect from one or more further communication devices, and/or deactivate respective communication circuits (e.g. RF front end, a communication module such as a BT module or a WLAN module). A communication device may be turned off. A communication device may disconnect from one or more further communication devices because the further communication devices may not be within the range of the communication device. For example, the communication device may be a mobile device, hence the further communication devices may not be located within the range of the communication device.

Once the conditions to establish connections between the communication device and a further communication device are restored, it may take some time for the communication device to communicate with the further communication device, depending on various elements and processes to be performed to establish a connection according to the communication protocol that is configured to govern the respective communication, which generally includes a step of detecting the presence of other communication device.

For example, in a connection to be established according to the BLE technology, peripheral devices may send advertisement packets that may be directed to all communication devices that can receive the advertisement packets or advertisement packets may be directed to a specific communication device. Furthermore, peripheral devices may be configured to operate in a mode, in which the time interval between advertisement packets may be long. The time interval between advertisement packets may be defined according to a duty cycle for the respective mode in order to conserve power. Accordingly, peripheral devices may operate in a mode of a low duty cycle. Additionally, or alternatively, peripheral devices may be configured to operate in a mode, in which there is no transmission of advertisement packets unless a further interaction (e.g. a detection such as detecting a presence with respect to a user, user pressing a button, user moving the peripheral device) is received. In various examples, the advertisement packets are included and/or provided by a beacon (e.g. a BLE beacon).

Once a peripheral device sends advertisement packets and cannot find a communication device (e.g. a central device according to BLE technology) to establish a connection, the peripheral device may start to operate in a mode to conserve power (as exemplary provided above, such as low duty cycle operation, or power-off) after a predefined condition (e.g. after a predefined period of time starting from sending the first advertisement packet). A peripheral device may operate in multiple modes in which the peripheral device changes its modes to conserve more power gradually, such as employing any combination of a first operation mode in which the peripheral device operates by sending advertisement packets with short intervals according to a high duty cycle, a second operation mode in which the peripheral device operates by sending advertisement packets with longer intervals according to a low duty cycle, a third operation mode in which the peripheral device operates by switching the communication circuit to a low power mode (e.g. powering off the communication circuit), and a fourth operation mode which the peripheral device turns off.

When the communication device, that such peripheral device may establish a connection with, becomes connectable (e.g. the peripheral device is within the range of the communication device), it may be desirable to establish a connection between the communication device and the peripheral device operating in a low power mode without further delays or inconsistencies. Especially in a scenario that there are multiple peripheral devices in the environment in which the communication device may establish a connection with each peripheral device, it may be desirable to consistently establish connections between the communication device and each peripheral device, since each peripheral device may operate in an operation mode that is different from another peripheral device. Such delays and inconsistencies may be caused by the peripheral device operating in a low power mode.

For example, in an environment where a central device (e.g. a computing device such as a mobile computing device) had paired multiple peripheral devices (e.g. a keyboard, a mouse, a joystick, a headset) to receive various services from the peripheral devices over established connections, the central device may disconnect from the peripheral devices when the central device is moved to another location, and accordingly peripheral devices may begin operating in a low power mode, for example, when they cannot identify a communication device to establish connections. Once the central device becomes connectable again, because each peripheral device may operate in a low power mode designated for the respective peripheral device, a considerable amount of time may be needed for the central device to connect each peripheral device again. As indicated above, some peripheral devices may even need further interactions to become connectable again.

It may be desirable to employ a further communication device (i.e. a proxy device) that may act as a proxy for the central device, which the proxy of the communication device may establish connections with peripheral devices and configure various aspects of the peripheral devices when the central device is not connectable, with an intention to enhance overall user experience. In a scenario as introduced above, the environment may also have a docking station that the user may use with the central device for various purposes (e.g. as hardware expansion, power supply, connection extensions). The docking station may include the further communication device to act as a proxy for the central device when the central device is not connectable. In such a scenario, the proxy may configure one or more peripheral devices to establish connections with the central device based on the state of the central device.

The connectable state of the central device may vary according to the range with respect to designated communication technology used for communication between the central device and peripheral devices: In an example that a central device is configured to communicate with peripheral devices according to a BT technology, although the BT technology may support a nominal maximum range of 100 meters for the classic BT technology (BR/EDR) and 400 meters for BLE, practically, and based on various limitations that communication devices may encounter in terms of use case, number of antennas, maximum transmission power, battery constraints, interferences, reflection, etc., the range of a BT connection may be more limited, such as less than 10 meters, 5 meters, or even less. In various examples, the connectable state of the central device may also be based on operating mode of the central device and/or peripheral devices. For example, a powered-off central device may also have a connectable state that is not connectable.

Figure 4:
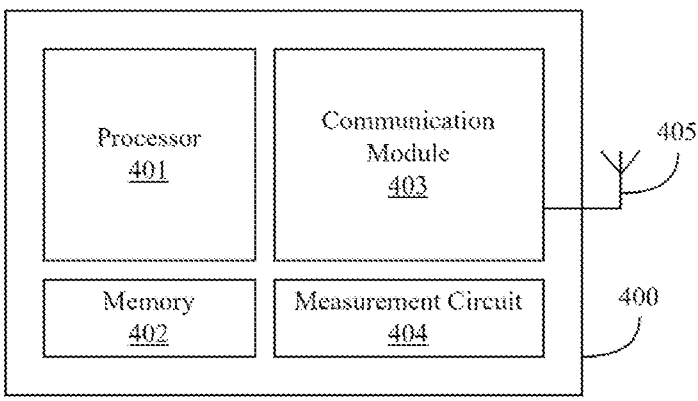
FIG. 4 shows an example illustration of an internal configuration of a communication device.

FIG. 4 shows an example illustration of an internal configuration of a communication device. The communication device 400 may include a processor 401, a memory 402, a communication module that is depicted as the communication module 403. In various aspects, the communication device may include a measurement circuit 404. The communication device 400 may further include, or the communication module 403 may be couplable to, an antenna 405. Although the antenna 405 is depicted as a single antenna, the antenna 405 may include a plurality of antennas, through which the communication device 400 may communicate with one or more further communication devices.

Analogous to the communication device exemplified in FIG. 2, the communication module 403 may include an RF transceiver (e.g. the RF transceiver 204) that is configured to receive and/or transmit radio communication signals via the antenna 405. In this illustrative example, the processor 401 is illustrated as a single processor, but this may not be limiting and the processor 401 may include one or more processors (e.g. the DSP 208, the protocol processor 210, the application processor 212). The processor 401 may be configured to perform operations according to one or more communication protocols over various layers of the corresponding protocol stack which the communication device 400 is designated to use to communicate with one or more further communication devices. The processor 401 may further be configured to handle the layers above the protocol stack, including the transport and application layers.

In accordance with various aspects, the communication module 403 may establish connections with multiple further communication devices. The communication module may include multiple RF transceivers to communicate with multiple communication devices simultaneously. Additionally, or alternatively, the communication module 403 may be configured to communicate with multiple further communication devices by scheduling different resources to communicate with each further communication device. The schedule of different resources may include scheduling time or frequency resources to communicate multiple further communication devices. The processor 401 may control the communication module 403 to communicate with multiple further communication devices accordingly.

In various examples, the processor 401 may be configured to perform operations to take a role of a primary device, a secondary device, a client device, and/or a server device in various aspects of this disclosure. In various examples, the communication device 400 may be configured to operate as a primary device and a client device (e.g. GATT client). In various examples, the communication device 400 may be configured to operate as a secondary device and a server device (e.g. GATT server).

The memory 402 may be configured to store various information and parameters as provided in this disclosure. In particular, the memory may store information with respect to further communication devices that the communication device may establish connections with, such as an identifier, one or more parameters with respect to perform communication operations with the respective further communication devices, and in particular, information related to central devices and/or peripheral devices and/or proxy devices in the environment. In various examples, the memory 402 may include necessary information to establish connections and communicate (e.g. pairing information, secure keys, etc.).

The measurement circuit 404 may perform measurements with respect to received radio communication signals. Accordingly, the processor 401 may obtain information with respect to the received radio communication signals. For example, the processor 401 may obtain signal strength, signal power, channel quality, reference signal strength indicators (RSSI) with respect to the radio communication signals that the measurement circuit 404 may measure.

In various examples, the communication device 400 may include further components, circuits, modules that are not shown in the illustrative example but provided in this disclosure. For example, the communication device 400 may include a data acquisition unit (e.g. a sensor) configured to monitor and/or detect various detectable attributes and/or events. In particular, the communication device 400 may include (or may be coupled to) a sensor configured to detect proximity, motion, or presence of a designated communication device (e.g. a central device). The data acquisition unit may provide information with respect to its operation as sensor data, and the processor 401 may perform calculations and determinations with respect to the received sensor data to obtain information.

The illustrative example with respect to FIG. 4 may refer to a scenario, in which the communication device 400 is a BLE communication device that is configured to communicate according to the BT specification, in particular, according to BLE technology. Accordingly, the communication module 403 may include a BLE communication module configured to transmit and/or receive BLE communication signals to communicate with one or more further BLE communication devices, and the processor 401 may be configured to perform operations according to the BLE protocol. The skilled person would appreciate that various aspects provided here may be performed by various entities that are configured to operate according to other communication protocols in a similar manner.

Figure 5:
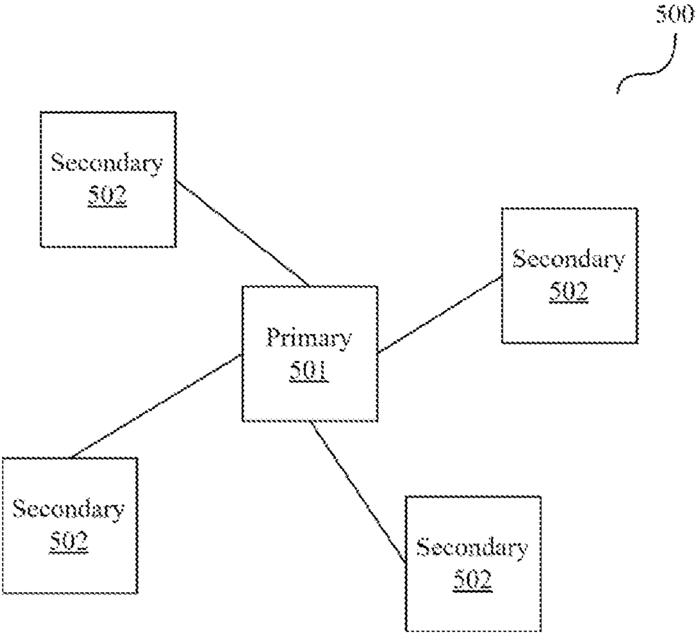
FIG. 5 shows an exemplary illustration of a network topology that BLE communication devices may use.

FIG. 5 shows an exemplary illustration of a network topology that BLE communication devices may use. BLE communication devices may be configured to communicate within a network 500 (e.g. piconet for BT networks). Each BLE communication device may undertake various roles within the network. For example, a BLE communication device may operate as a primary device 501 (e.g. master device, central device) or a secondary device 502 (e.g. slave device, peripheral device). A primary device 501 may be a BLE communication device that may initiate a connection request to a BLE communication device that advertises its presence. A secondary device 502 may be a BLE communication device that receives a connection request from a primary device 501.

Each secondary device 502 may be communicatively coupled to the primary device over an established connection, collectively forming the network 500. The primary device 501 may coordinate communication through the network 500. It may be possible for the primary device 501 and the secondary devices 502 to change the roles in-between, such that the primary device 501 may become a secondary device and one of the secondary devices 502 may become a primary device in the network 500 in various examples. In various examples, the primary device 501 may establish and maintain an order and a polling scheme, including designating time slots for the secondary devices 502. The number of secondary devices 502 in the network may vary. Furthermore, the network 500 may be communicatively coupled to another network over at least one of the devices resulting in a scatternet for BT devices. In a scatternet, a device that may be a primary device or a secondary device for one network, may act as a secondary device for another network. In such cases, the device may employ time multiplexing to transmit/send radio communication signals to multiple networks.

Furthermore, each BLE communication device may also undertake various roles, especially in terms of resource management. The BLE communication includes a communication between BLE communication devices according to a Generic Attribute Profile (GATT) to exchange data. BLE communication devices may communicate using GATT over an established connection, in which a BLE communication device may be a client device that is configured to access resources over the established connection or a server device that is configured to provide resources over the established connection. Usually, the primary device 501 may be the client device that may access the resources provided by the secondary device 502 that may be the server device. The client device may configure one or more characteristics of one or more services according to which the server device may operate.

Figure 6:
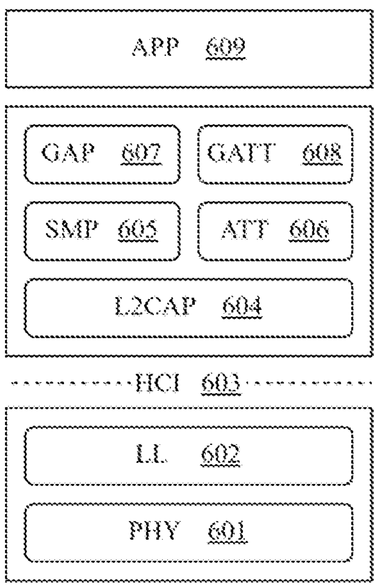
FIG. 6 shows an exemplary illustration of a protocol stack according to the BLE protocol.

FIG. 6 shows an exemplary illustration of a protocol stack according to the BLE protocol. Each layer of the BLE protocol stack provides various functions to provide services as exemplary provided in this disclosure. BLE protocol stack includes a controller layer defining lower layers of the BLE protocol stack, a host layer defining upper layer of the BLE protocol stack, and an application layer 609 providing an interface between user applications and the BLE protocol stack.

The controller layer includes a physical (PHY) layer 601 configured to perform PHY functions including modulation/demodulation, channel coding/decoding, etc. The controller layer further includes a link layer (LL) 602 configured to perform LL functions that includes control of access, in particular, advertising, scanning, establishing and maintaining connections, interfacing with the PHY layer 601, and defining a role for the respective BLE communication device. Furthermore, a host controller interface (HCI) layer 603 is provided between the controller layer and the host layer. The HCI layer 603 is configured to provide communication between the controller layer and the host layer through standard interface types. The HCI layer 603 can be implemented using application programming interfaces (API) or other interfaces such as universal asynchronous transmitter-receiver (UART) interface, universal serial bus (USB) interface, or serial peripheral interface (SPI).

The host layer includes a logical link control and adaptation protocol (L2CAP) layer 604 configured to perform L2CAP functions that may include encapsulation/decapsulation of BLE packets. The host layer further includes a security manager protocol (SMP) layer 605 configured to perform SMP functions that may include encryption and decryption of data, pairing security, key distributions. The host layer further includes an attribute protocol (ATT) layer 606 configured to perform ATT functions that may include the transfer of attribute data between clients and servers in GATT, defining the role of a client or a server for the BLE communication device, and organizing data into various attributes.

The host layer further includes a generic access profile (GAP) 607 configured to perform GAP functions. GAP functions include device discovery, controlling connections of the respective BLE communication device, and advertising. In accordance with various aspects of this disclosure, GAP functions may further include adjustment of various parameters to establish a connection with another BLE communication device, such as advertising modes, advertisement intervals (i.e. duty cycle for advertisements), etc.

The host layer further includes a generic attribute profile (GATT) 608 configured to perform GATT functions. GATT functions include handling data communications over an established connection, such as initiating (by a client BLE device) commands and requests toward the server and receiving responses, indications, and notifications from a server, accepting (by a server BLE device) received commands and requests and sending responses, indications, and notifications from a server. In accordance with various aspects of this disclosure, GATT functions may further include sending and/or receiving an indication with respect to another communication device being connectable. In accordance with various aspects of this disclosure, GATT functions may further include sending and/or receiving an indication of a change at a duty cycle for advertisements. In accordance with various aspects of this disclosure, GATT functions may further include sending and/or receiving an indication of a duty cycle for advertisements.

Figure 7A:
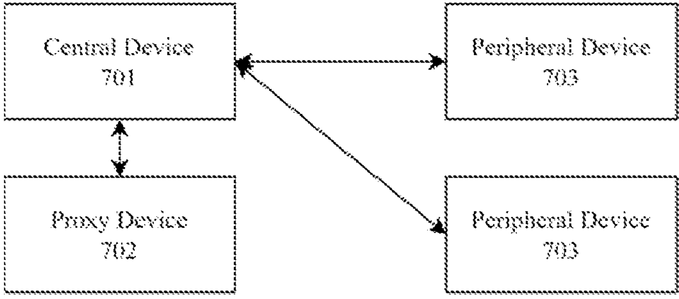
FIG. 7A and FIG. 7B show exemplary illustrations of a network when a central device is available and when the central device is not available.
Figure 7B:
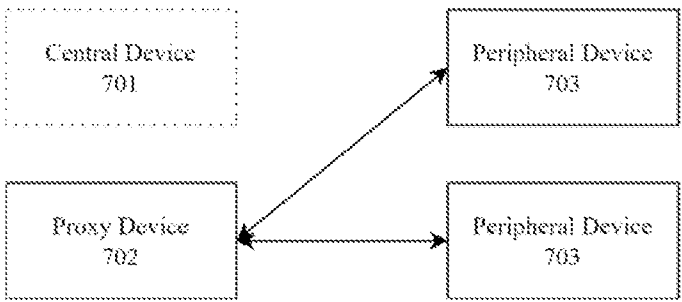

FIG. 7A and FIG. 7B show exemplary illustrations of a network when a central device is available and when the central device is not available. The network includes a central device 701, a proxy device 702, and one or more peripheral devices 703. Each entity may be, or may include, a communication device (e.g. the communication device 400) provided in this disclosure. The central device 701 may form the network by establishing connections with each peripheral device 703 through which the central device 701 may communicate with the peripheral devices 703. In one example, the central device 701 may be a computing device, such as a computer (e.g. tablet computer, laptop computer) or a mobile phone. The peripheral devices 703 may include peripheral devices such as a keyboard, a mouse, a headset, a loudspeaker, a printer, etc. In one example, the proxy device 702 may be a peripheral device such as a docking station for the central device 701. The proxy device 702 may be communicatively or electrically coupled to the central device 701. In various examples, the proxy device 702 may also have established a connection with the central device 701 according to a communication protocol.

The following aspects with respect to the illustrative example may be provided in a manner that the central device 701, the proxy device 702, and the peripheral devices 703 are configured to perform communication operations according to a particular communication protocol, namely the BLE communication protocol. In such an example, the central device 701 may have taken a role of a primary device (i.e. central device) for each connection with respect to the proxy device 702 and the peripheral devices 703. Accordingly, when the proxy device 702 and the peripheral devices 703 are connected to the central device 701, they may take a role of a secondary device within their respective connections, as exemplary provided in FIG. 7A.

The central device 701 may send information to identify the peripheral devices 703 to the proxy device 702, and accordingly, the proxy device 702 may be aware of the peripheral devices 703 that the proxy device 702 may connect when the central device 701 is not connectable. Such information may include an identifier that may identify a respective peripheral device 703. For example, peripheral devices 703 may have designated universally unique identifiers (UUID), and the central device 701 may send UUIDs of the peripheral devices 703 that are connected to the central device 701. Other examples of identifiers may include Medium Access Control (MAC) addresses (i.e. MAC ID), or any type of addresses (e.g. ASCII strings, addresses) designated for the peripheral devices 703. In various examples, there may be a plurality of central devices within the vicinity of the proxy device 702, and the proxy device 702 may be configured to maintain connection state with the plurality of central devices. In such a case, each central device may send information to identify peripheral devices that are connected to the respective central device sending the information, and the proxy device 702 may be configured to perform operations with respect to each central device as provided in this disclosure for the central device 701 connected to the peripheral devices 703. In such example, each central device may store information to identify peripheral devices that are connected to the respective central device in a memory and send the information to the proxy device 702.

The central device 701 may send information to identify the peripheral devices 703 to the proxy device 702 in an encoded message. The central device 701 may encode such a message periodically or aperiodically. In various examples, the central device 701 may encode such a message before ceasing connections with the peripheral devices 703 and/or the proxy device 702. In various examples, the central device 701 may send the message using a GATT transaction, and accordingly, the respective one or GATT messages may include the information to identify the peripheral devices 703.

The connections between the central device 701 and other communication devices (i.e. the peripheral devices 703, the proxy device 702) may be ceased. In various examples, the central device 701 may be a mobile device and may be taken by a user and moved away out of the ranges with respect to the connections in-between. In response to a disconnection, each peripheral device 703 may start transmitting radio communication signals including advertisement packets that each peripheral device 703 may configure and schedule according to their respective GAP configurations. In accordance with various aspects of this disclosure, the advertisement packets may be included in one or more beacon signals (e.g. a BLE beacon) that are broadcasted. The BLE beacon may include a BLE data frame including the advertisement packet.

The proxy device 702 may, in response to a disconnection from the central device 701, establish connections with each of the peripheral devices 703. The proxy device 702 may configure GAP operations to take a role of a primary device in response to the disconnection. The proxy device 702 may, in response to a disconnection from the central device 701 to which there has been a connection that the proxy device 702 is a secondary device, configure GAP operations to take a role of a central device. Accordingly, the processor of the proxy device 702 may be configured to scan connectable BLE devices within the range that the proxy device 702 may establish connections, in response to the disconnection. In a case that there is a plurality of central devices which the proxy device 702 maintains connections, the proxy device 702 may, in response to disconnections from some disconnected central devices, establish connections with the peripheral devices that were connected to the disconnected central devices, as provided in this disclosure for the central device 701 connected to the peripheral devices 703.

In various examples, the proxy device 702 may include a memory that stores secondary device information indicating communication devices which the proxy device 702 may establish connections by taking a role of a primary device. For example, the secondary device information may include identifiers (e.g. MAC identifier, UUID, etc.) of BLE devices. Similarly, the memory may store primary device information indicating communication devices which the proxy device 702 may establish connections by taking a role of a secondary device. The proxy device 702 may establish connections with other BLE devices by determining the role of the proxy device 702 for a connection with another BLE device according to the primary device information or the secondary device information to configure GATT.

The proxy device 702 may obtain information (e.g. scan result) with respect to the connectable BLE devices. The obtained information may include information with respect to the connectable BLE devices, such as identifiers for connectable BLE devices (e.g. MAC addresses, UUIDs, etc.), signal strengths with respect to received radio communication signals from the connectable BLE devices, further advertisement data that the connectable BLE devices had included in respective advertisement packets, etc. Based on the obtained information, the proxy device 702 may select the connectable BLE devices according to the information received from the central device 701 to identify the peripheral devices 703.

The proxy device 702 may send a connection request to the peripheral devices 703 to establish connections with the peripheral devices 703. Accordingly, a connection between each peripheral device 703 and the proxy device 702 may be created. In various examples, the proxy device 702 may take a role of a primary device for each of the connections. In various examples, for each connection, the proxy device 702 may take a role of a GATT client, and one of the peripheral devices 703 may take a role of a GATT server. FIG. 7B shows an example illustration of such a network.

In various aspects, the proxy device 702 may configure an established connection with at least one of the peripheral devices 703 to conserve the power of the respective peripheral device 703. The proxy device 702 may configure a connection interval for the respective peripheral device 703, at which the respective peripheral device 703 perform a connection event (e.g. transmit and/or receive) at each interval for a period of time and not perform any communication operation for the rest of the time. In various examples, the proxy device 702 may send a GATT message comprising information indicating the connection interval configured for the respective peripheral device 703. The GATT message may cause the respective peripheral device 703 to perform connection events with a first interval.

In various examples, the configured connection interval for the respective peripheral device 703 may be defined by a duty cycle for the respective peripheral device 703, representing a fraction of time in which the respective peripheral device 703 may transmit and/or receive radio communication signals, and at least the RF circuit of the respective peripheral device 703 may enter a low power mode (e.g. radio off) at the rest of the fraction of time. Hence, the proxy device 702 may configure the connection interval for the respective peripheral device 703 and the processor of the respective peripheral device 703 may configure its transceiver to selectively perform a communication event or operate in a low power mode (e.g. radio power off) based on the configured connection interval received from the proxy device 702.

In various examples, the proxy device 702 may set the communication interval with an intention to solely maintain the connection between the proxy device 702 and the peripheral devices 703. For this purpose, the proxy device 702 may set the communication interval with a maximum communication interval. For example, BLE communication technology may allow an interval between 7.5 milliseconds to 4 seconds. The proxy device 702 may configure the connection interval for each of the peripheral devices 703 to 4 seconds, or between 2 seconds and 4 seconds, or between 1 second and 4 seconds, or any other connection interval that is deemed as fit.

The proxy device 702 may configure the connections with the peripheral devices 703 as service-level connections. Accordingly, the proxy device 702 may maintain the connection with each of the peripheral devices 703 by exchanging data at the L2CAP level. Accordingly, in a service level connection, the processor of the proxy device 702 may perform L2CAP functions to pass the data to maintain the connection to the RFCOMM functions that transmit/receive data to/from the peripheral devices 703. Similarly, the peripheral devices 703 may receive/transmit data with the RFCOMM functions that receive services from L2CAP functions that the respective processors of the respective peripheral devices 703 are configured to perform.

Furthermore, the proxy device 702 may determine that the central device 701 is connectable. In particular, the proxy device 702 may determine that the central device 701 is connectable based on radio communication signals received from the central device 701. The proxy device 702 may schedule resources to monitor the communication state of the central device 701, in particular, whether the central device 701 is connectable or not. For this purpose, the proxy device 702 may perform a scan periodically to detect whether there are radio communication signals transmitted by the central device 701. The central device 701 may be configured to broadcast advertisements indicating that the central device 701 is connectable, and the proxy device 702 may receive radio communication signals including the advertisements of the central device 701, and the proxy device 702 may determine that the central device 701 is connectable when the proxy device 702 receives a radio communication signal from the central device. In a case that there is a plurality of central devices which the proxy device 702 has maintained connections, the proxy device 702 may perform the same operation for the disconnected central devices, to determine whether one or more of them are connectable, as provided in this disclosure for the central device 701 connected to the peripheral devices 703.

In various examples, the proxy device 702 may further perform measurements of radio communication signals received from the central device 701. The proxy device 702 may measure the signal strength of the received radio communication signals to obtain reference signal strength indicators (RSSIs) with respect to the central device 701. Accordingly, the proxy device 702 may determine whether the central device 701 is connectable or not based on RSSI measurements. For example, the proxy device 702 may determine that the central device 701 is connectable when one or more RSSI measurements are above a predefined threshold.

In various examples, the proxy device 702 may further include one or more data acquisition units (e.g. sensors) configured to acquire data with respect to the environment of the proxy device 702. The proxy device 702 may determine that the central device is connectable based on the acquired data (e.g. sensor data) with respect to the environment. For example, the processor of the proxy device 702 may detect the presence of the central device 701 based on the sensor data. Based on the sensor data, the proxy device 702 may determine that the central device 701 is connectable. The processor of the proxy device 702 may estimate a proximity to the central device 701 based on the sensor data, and the proxy device 702 may determine that the central device 701 is connectable based on the estimated proximity.

Furthermore, especially in a scenario where the proxy device 702 is a docking station, the proxy device 702 may be configured to detect the presence of the central device 701 over an input port (e.g. USB port) dedicated to connect to the central device 701. For example, the user of the central device 701 may attach the central device 701 to the proxy device 702 over the input port. The proxy device 702 may determine that the central device 701 is connectable based on signals received from the input port.

In response to the determination that the central device 701 is connectable, the proxy device 702 may inform the peripheral devices 703 that the central device 701 is connectable, so that the peripheral devices 703 may connect back to the central device 701. Furthermore, the proxy device 702 may configure the peripheral devices 703 to cause each peripheral device 703 to perform advertising. In various examples, the proxy device 702 may configure the peripheral devices 703 to cause each peripheral device 703 to transmit advertisement packets with an interval that is suitable to speed up the connection process of the respective peripheral device 703 to connect to the central device 701. In a case that there is a plurality of central devices which the proxy device 702 has determined that they are connectable, the proxy device 702 may perform the same operation for the disconnected central devices, to inform respective peripheral devices that were connected to the connectable central devices to cause the respective peripheral devices to connect back to the connectable central devices, as provided in this disclosure for the central device 701 connected to the peripheral devices 703.

In various examples, the proxy device 702 may configure the peripheral devices 703 to begin advertising process in which there is an advertising interval provided between two advertisement packets to be transmitted by the peripheral devices 703. The proxy device 702 may configure the peripheral devices 703 to set an advertising interval that is smaller than the first interval. In various examples, the proxy device 702 may configure the peripheral devices 703 to perform a low duty cycle advertising to connect to the central device 701, wherein the advertising interval for the low duty cycle advertising is set to an interval that is smaller than the first interval. In various examples, the proxy device 702 may configure the peripheral devices 703 to perform a high duty cycle advertising to connect to the central device 701.

For example, a processor of a BLE device may be configured to cause the BLE device to transmit advertisement packets based on an advertising interval that is set by 0.625 ms*N where N is an integer. A processor of a BLE device may be configured to cause the BLE device to transmit advertisement packets based on an advertising interval that is smaller than 10 ms for a low duty cycle advertising operation. A processor of a BLE device may be configured to cause the BLE device to transmit advertisement packets based on an advertising interval that is smaller than 3.75 ms for a high duty cycle advertising operation. In various examples, a processor of a BLE device may be configured to cause the BLE device to transmit advertisement packets based on an advertising interval that is smaller than 7.5 ms for a high duty cycle advertising operation.

In various examples, the proxy device 702 may encode a message to be transmitted to the peripheral devices 703 in response to the determination that the central device 701 is connectable. The proxy device 702 may encode the same message for all of the peripheral devices 703, or the proxy device 702 may encode a message for each one of the peripheral devices, to cause the peripheral devices 703 to start advertising to connect to the central device 701 as provided in this disclosure.

In various examples, the encoded message may include information indicating that the central device 701 is connectable. The peripheral devices 703 may be configured to perform advertising with a predefined configuration (e.g. high duty cycle, low duty cycle, with a predefined advertising interval, etc.) in response to received message indicating that the central device 701 is connectable. The advertising with the predefined configuration may include scheduling a plurality of advertisement packets to be transmitted, in which a predefined interval is defined between two consecutive advertisement packets. The peripheral devices 703 may schedule the advertisement packets accordingly.

In various examples, the encoded message may include information indicating an advertising mode for the advertising operation. The encoded message may indicate to the peripheral devices 703 to perform advertising according to a low duty cycle advertising mode, or a high duty cycle advertising mode. Accordingly, each peripheral device 703 may schedule a plurality of advertisement packets to be transmitted, in which an advertising interval according to the indicated mode is defined between two consecutive advertisement packets.

The encoded message may further include information indicating the advertising interval to be used for the advertising procedure of the peripheral devices 703. Accordingly, each peripheral device 703 may schedule a plurality of advertisement packets to be transmitted, in which an advertising interval according to the indicated advertising interval is defined between two consecutive advertisement packets.

A peripheral device 703 may receive the radio communication signals including the message, and the processor of the peripheral device 703 may decode the received message according to the BLE stack. In various examples, the decoded message may include a GATT message. The peripheral device 703 may configure GAP functions with respect to the advertising procedure to connect to the central device 701 based on the GATT message received from the proxy device 702.

Accordingly, the processor of the peripheral device 703 may obtain information with respect to the advertising procedure to be performed by the peripheral device 703 to connect to the central device 701 using GATT functions. For this purpose, the peripheral device 703 (i.e. GATT server) may define a service with respect to various GAP functions based on which the peripheral device 703 may perform the advertising procedure within a GATT profile. Such characteristics may be configured with respect to an instruction to perform an advertising procedure to connect to another BLE device, an advertising mode, an advertising interval, and an identifier to perform a directed advertising procedure.

For example, in case the received GATT message sets the characteristic with respect to performing an advertising procedure to connect to another BLE device, the processor of the peripheral device 703 may configure an advertising procedure to be performed by the peripheral device 703 using GAP functions. The GAP functions may perform operations to prepare and schedule advertisement packets to be transmitted by the peripheral device 703 based on the set characteristic.

Furthermore, the processor of the peripheral device 703 may provide instructions to the GAP layer of the BLE stack using GAP functions to configure the advertising procedure based on the characteristics set with the GATT message. For example, based on the set characteristic with the GATT message, the processor of the peripheral device 703 may set the advertising mode to be used by the GAP functions to perform advertising. Exemplarily, the processor may provide instructions to GAP layer using GAP functions to perform a high duty level advertising, a low duty level advertising, an advertising that is directed to the central device 701 (i.e. by including an identifier for the central device 701 within advertisement packets), an indirect advertising. Furthermore, the processor may provide instructions to GAP layer using GAP functions to designate an advertising interval for the advertising procedure to be performed by the peripheral device 703.

Accordingly, the processor of the peripheral device 703 may configure various parameters with respect to the advertising procedure to be performed by the peripheral device 703 to connect to the central device 701 based on one or more GATT messages received from the proxy device 702 over the established connection. The processor of the peripheral device 703 may use GATT functions to obtain the information with respect to the parameters to be configured, and the processor of the peripheral device 703 may use GAP functions to configure the advertising procedure.

The encoded message may further include an identifier for the central device 701. The identifier may be an identifier of the central device 701 (e.g. MAC address, UUID, etc.) or information that may indicate the identity of the central device 701 to the peripheral devices 703. Accordingly, the peripheral devices 703 may perform a directed advertising procedure to connect to the central device 701. In a directed advertising procedure, the processor of the peripheral devices 703 may encode advertisement packets that include an identifier for the communication device that the peripheral devices 703 intend to connect. Accordingly, the advertisement packets may include an identifier of the central device 701.

Furthermore, the proxy device 702, or each peripheral device 703 may cease the connection that was established between the proxy device 702 and the respective peripheral device 703 based on the message. The proxy device 702 may cease the connection established with each peripheral device 703 in response to transmission of the encoded message to the respective peripheral device 703, or in response to receiving an acknowledgment message from the respective peripheral device 703 indicating that the message is received. Similarly, each peripheral device 703 may cease the connection established with the proxy device 702 in response to receiving the encoded message, or in response to transmitting an acknowledgment message to the proxy device 702 indicating that the message is received.

Accordingly, the transceiver of each peripheral device 703 may transmit radio communication signals including advertisement packets, in which an interval is provided within two consecutive advertisement packets, wherein the interval is set based on the received message. The interval may be set according to a low duty cycle advertising mode or a high duty cycle advertising mode.

Figure 8:
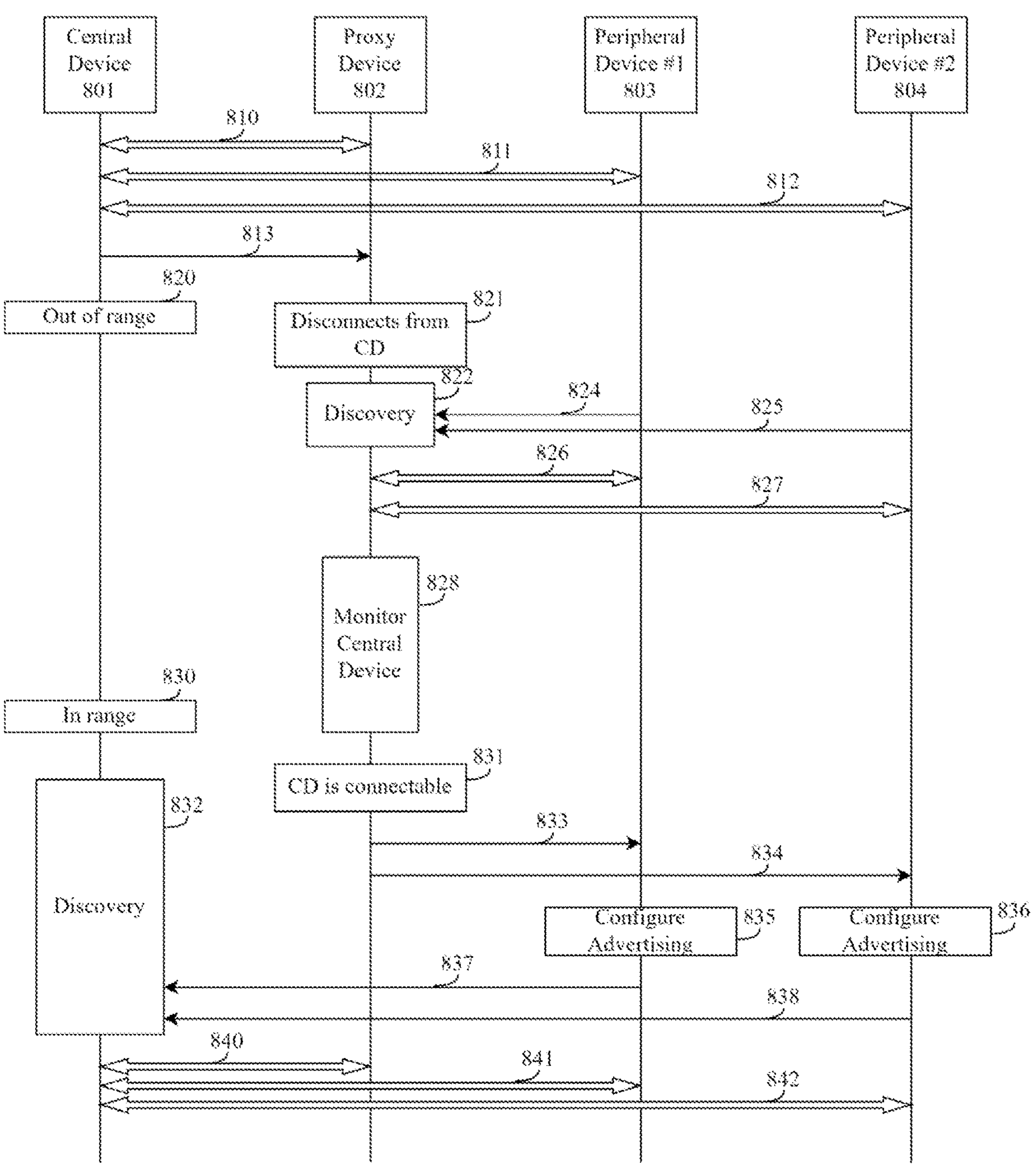
FIG. 8 shows an example of communication procedure in accordance with various aspects of this disclosure.

FIG. 8 shows an example of a communication procedure in accordance with various aspects of this disclosure. The example shows communication between a central device 801, a proxy device 802, a first peripheral device 803, and a second peripheral device 804. Each of these devices includes various aspects of respective communication devices provided in this disclosure. The communication procedure may include the involvement of other communication devices, especially as peripheral devices, and additionally or alternatively, central devices or proxy devices.

The central device 801 may have connections 810, 811, 812 that are established with the proxy device 802, the first peripheral device 803, and the second peripheral device 804 respectively. In various examples, the communication devices are BLE devices, hence the connections 810, 811, 812 may be BLE connections. The central device 801 may communicate with the proxy device 802, and the peripheral devices 803, 804 to exchange data in order to receive various services from these devices. Furthermore, the central device 801 may transmit a message 813 including information with respect to the peripheral devices 803, 804 to the proxy device 802. Exemplarily, the message may include an identifier (e.g. MAC address, UUID, etc.) for the peripheral devices 803, 804, so that the proxy device 802 may establish connections with the peripheral devices 803, 804 in case the central device 801 is not connectable. The proxy device 802 may store the identifier for the peripheral devices 803, 804 in a memory.

In accordance with various aspects of this disclosure, the central device 801 may become disconnected at least from the proxy device 802. As exemplarily provided, the central device 801 may be moved out of range 820 to maintain the connections between the proxy device 802 and the peripheral devices 803, 804, resulting in a disconnection of the proxy device 802 from the central device 801. In response to the disconnection, the processor of the proxy device 802 may configure communication operations to take a role of a primary device (e.g. a central device in BLE). Accordingly, the proxy device 802 may initiate a discovery procedure 822, in which the proxy device 802 scans incoming advertisement packets.

Furthermore, in response to the disconnection from the central device 801, the peripheral devices 803, 804 may initiate an advertising procedure in which the peripheral devices 803, 804 may transmit advertisement packets 824, 825. In various examples, the peripheral devices 803, 804 may be previously paired with the proxy device 802 and the central device 801. Pairing may include the exchange of data to establish a connection that is secure through a previously defined pass-phrase (e.g. passkey, password, personal identification number (PIN) that may be designated by the end of the inquiry).

The proxy device 802 may receive the advertisement packets 824, 825 provided by the peripheral devices 803, 804 and transmit a connection request message to the peripheral devices 803, 804. Accordingly, the proxy device 802 may establish a first connection 826 with the first peripheral device 803, and the proxy device 802 may establish a second connection 827 with the second peripheral device 804. Furthermore, the proxy device 802 may configure the first connection 826 and the second connection 827 with a connection interval, in which each of the first peripheral device 803 and the second peripheral device 804 perform a communication event (e.g. transmit and/or receive) based on the connection interval. In various examples, the first peripheral device 803 and the second peripheral device 804 may perform communication events, wherein an interval based on (or equal to) the connection interval is defined between two subsequent communication events. In various examples, the first peripheral device 803 and the second peripheral device may be configured to operate in a low power mode (e.g. radio off) between the two subsequent communication events.

Furthermore, the proxy device 802 may enter into an operation mode in which the proxy device 802 may monitor received radio communication signals. The proxy device 802 may be configured to receive radio communication signals and perform decoding and/or measurements with respect to the received radio communication signals to determine whether the central device 801 is connectable (e.g. back in the range) again. In various examples, the proxy device 802 may operate in a discovery mode in which the proxy device 802 may perform a scan to identify packets (e.g. advertisement packets, broadcasts) transmitted by the central device 801 for a period of time that may be defined based on a monitoring interval.

The central device 801 may become connectable (e.g. the central device 801 move into the range 830 that a connection may be established), and the proxy device 802 may determine 831 that the central device 801 is connectable again. Furthermore, the central device 801 may enter into a discovery mode as a central device (or into a broadcaster mode) in which the central device 801 may detect devices that the central device 801 may establish a connection with.

Accordingly, the proxy device 802 may transmit a first message 833 to the first peripheral device 803 and transmit a second message 834 to the second peripheral device 804, wherein the first message 833 and the second message 834 comprise information indicating that the central device 801 is connectable again to cause the first peripheral device 803 and the second peripheral device 804 to transmit advertisement packets with an interval that is smaller than the connection interval(s) defined for the first connection and the second connection. As provided in various examples, the message may further include information with respect to advertising modes or advertising intervals, etc.

The first peripheral device 803 may configure 835 advertising procedure based on the first message 833 and the second peripheral device 804 may configure 836 advertising procedure based on the second message 834. Accordingly, the first peripheral device 803 may transmit advertisement packets 837 and the second peripheral device 804 may transmit advertisement packets 838 according to the their respective configured advertising procedures. Furthermore, the proxy device 802 may also switch to an operation mode in which the proxy device 802 may take a role of a secondary device in a connection and the proxy device 802 may transmit advertisement packets.

The central device 801 may receive the advertisement packets and send communication requests to each of the first peripheral device 803, the second peripheral device 804, and the proxy device 802 to establish connections. Accordingly, the central device 801 may have established a first connection 840 with the proxy device 802, a second connection 841 with the first peripheral device 803, and a third connection 842 with the second peripheral device 804.

Figure 9:
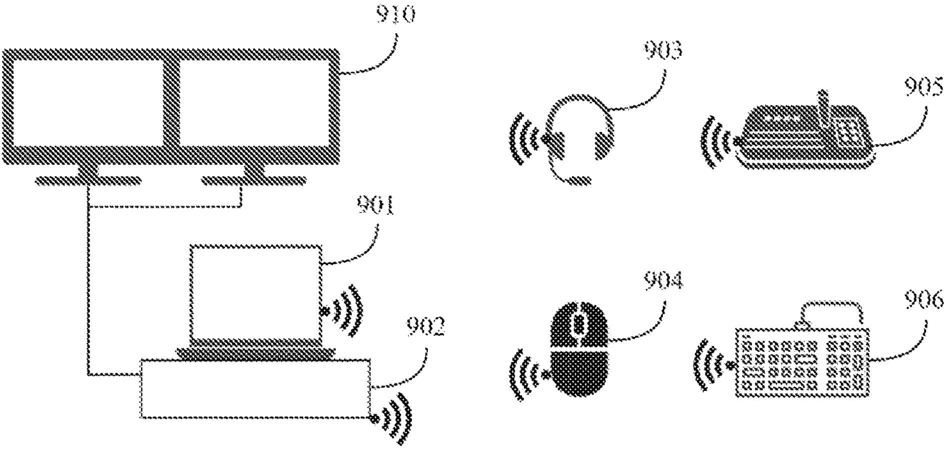
FIG. 9 shows an exemplary environment according to various aspects.

FIG. 9 shows an exemplary environment according to various aspects. In various examples, the central device may be a computer 901, and the proxy device may be a docking station 902 that is arranged to provide services (e.g. expansion dock, mounting base, charging, etc.) for the computer 901 which may be connectable to the computer 902. Furthermore, the docking station 902 may connect the computer 901 to one or more displays 910 that are configured to display one or more screens provided by the computer 901. The docking station 902 may be coupled to the one or more displays 910. In such environment, the peripheral devices as provided in this disclosure may include a headset 903, a mouse 904, a joystick 905, and/or a keyboard 906 that are configured to perform communication operations according to a radio communication technology as provided in this disclosure.

Figure 10:
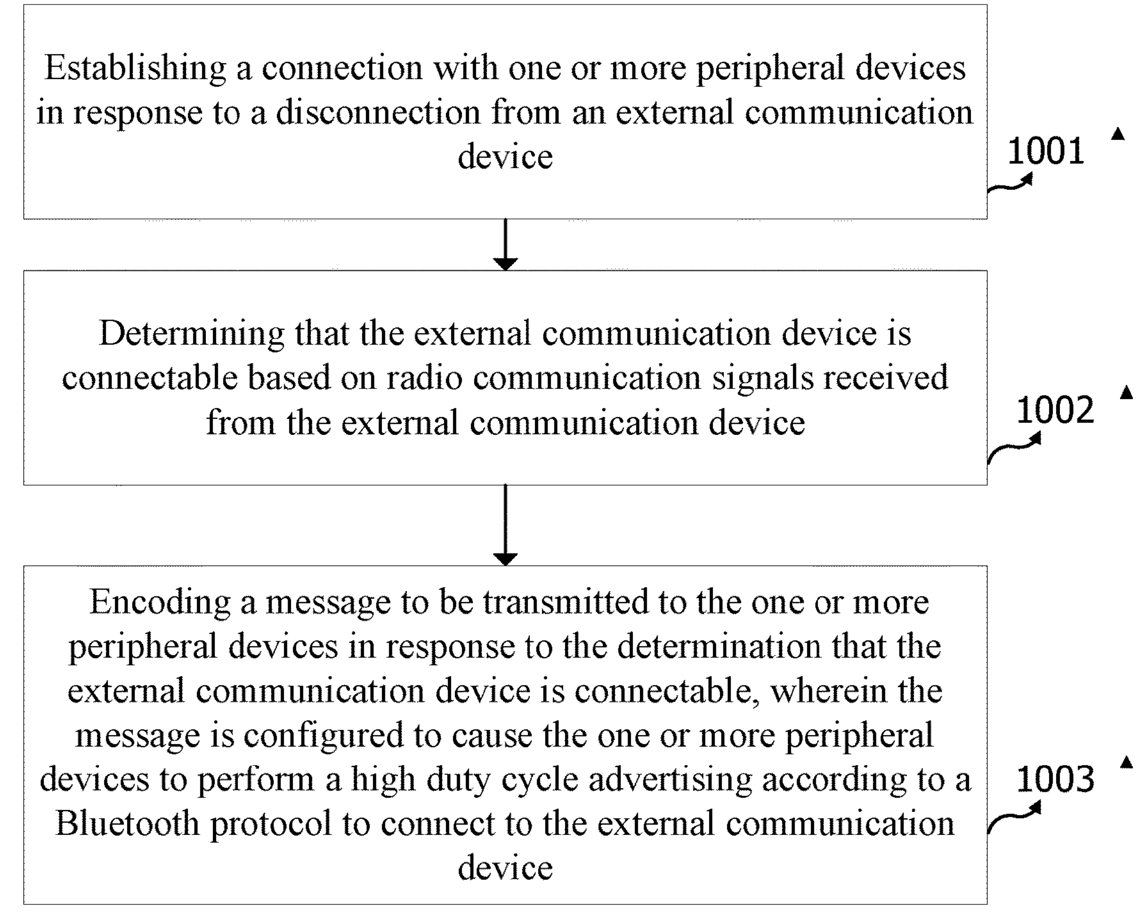
FIG. 10 shows an example of a method.

FIG. 10 shows an example of a method. The method may include establishing 1001 a connection with one or more peripheral devices in response to a disconnection from an external communication device, determining 1002 that the external communication device is connectable based on radio communication signals received from the external communication device, encoding 1003 a message to be transmitted to the one or more peripheral devices in response to the determination that the external communication device is connectable, wherein the message is configured to cause the one or more peripheral devices to perform a high duty cycle advertising according to a Bluetooth protocol to connect to the external communication device.

Referring back to FIG. 3, in such a network environment, in particular, when the network includes an access network and the communication device 301 includes a node serving as an access node (e.g. an access point) to communicate with another network (e.g. wide area network), network congestion or overload may occur that may cause delays with respect to packet queueing, packet loss, or inability to establish new connections.

In particular, a communication device may run multiple applications that may cause congestion with respect to the particular connection through the designated communication channel with the access node. Considering that each application may cause a considerable amount of data traffic within the network, in particular over the communication channel, it may be desirable to offload some of the data traffic to a relay device over another connection. The relay device may relay data between the communication device and another communication device.

Furthermore, applications may be configured to cause the communication device to communicate under different conditions, limitations, and constraints. It may be desirable to offload the communication operations (transmit and/or receive) to one or more offload devices in an application-based manner. Offload devices may have different capabilities in terms of bandwidth, error correction, support of communication technologies, etc. Accordingly, it may be further desirable to perform an application-based offload of data traffic in consideration of the communication capabilities of the offload devices.

Furthermore, the connection to be established between the communication device running the applications and the offload device taking over the transmission and the reception of the application data (offload communication data) to/from another network (e.g. WAN) may be obtained through various communication means that may involve using particular communication protocols or particular communication technologies that are different than the protocols and/or technologies that the communication device may use to communicate application data with respect to the applications that are not offloaded (direct communication data). It may be desirable to provide management for the communication operations of the communication device with respect to the direct communication data and the offload communication data.

Furthermore, in particular, in case the communication device communicates the direct communication data and the offload communication data using the same communication module, it may be desirable to provide management of resources for the communication operations of the communication device with respect to the direct communication data and the offload communication data.

Figure 11:
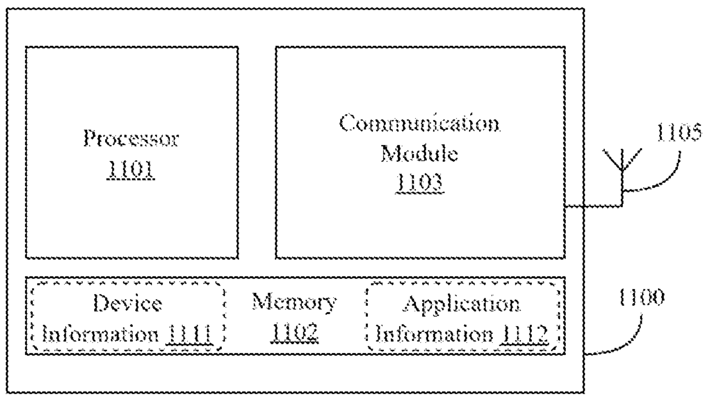
FIG. 11 shows an example of a communication device.

FIG. 11 shows an example of a communication device. The communication device 1100 may include a processor 1101, a memory 1102, and a communication module 1103. Analogous to the communication device exemplified in FIG. 2, the communication module 1103 may include an RF transceiver (e.g. the RF transceiver 204) that is configured to receive and/or transmit radio communication signals via an antenna 1105.

In this illustrative example, the processor 1101 is illustrated as a single processor, but this may not be limiting and the processor 1101 may include one or more processors (e.g. the DSP 208, the protocol processor 210, the application processor 212). The processor 1101 may be configured to perform operations according to one or more communication protocols over various layers of the corresponding protocol stack which the communication device 1100 is designated to use to communicate with external communication devices. The processor 1101 may use the corresponding protocol stack to communicate with an external communication device according to the designated communication protocol for the communication.

The processor 1101 may further be configured to handle the layers above the protocol stack, including the transport and application layers. The communication device 1100 may further include, or the communication module 1103 may be couplable to, the antenna 1105. Although the antenna 1105 is depicted as a single antenna, the antenna 1105 may include a plurality of antennas, through which the communication device 1100 may communicate with one or more external communication devices. In various examples, the plurality of antennas may be configured to receive and transmit radio communication signals according to various radio communication technologies.

In accordance with various aspects, the communication module 1103 may establish connections with multiple external communication devices. The communication module 1103 may include multiple transceivers (e.g. multiple transceiver circuits for wireless (RF) or wired communications)

to communicate with multiple communication devices simultaneously. Additionally, or alternatively, the communication module 1103 may be configured to communicate with multiple external communication devices by using different resources to communicate with each external communication device. The processor 1101 may schedule the different resources to be used by the communication module 1103 to communicate with multiple external communication devices. The schedule of different resources may include scheduling time or frequency. The processor 1101 may control the communication module 1103 to communicate with multiple external communication devices accordingly.

Illustratively, the communication module 1103 may include a transceiver circuit to transmit and/or receive radio communication signals according to a WLAN communication protocol. Additionally, the communication module 1103 may include a transceiver circuit to transmit and/or receive radio communication signals according to a Wi-Fi Direct communication protocol (i.e. WLAN P2P). Additionally, or alternatively, the communication module 1103 may include a transceiver circuit configured to transmit and/or receive communication signals according to a wired (e.g. Universal Serial Bus (USB)) communication protocol. In such an example of wired communication, the communication device 1100 may further include a communication port (e.g. a USB port) to establish a wired connection with an external communication device.

The memory 1102 may be configured to store various information and parameters as provided in this disclosure. In particular, the memory may store information with respect to external communication devices that the communication device 1100 may establish connections with, such as an identifier, one or more parameters with respect to perform communication operations with the respective external communication devices.

In various examples, the memory 1102 may include an operating system (not shown) including instructions configured to manage various operations of the processor 1101, the memory 1102, and the communication module 1103, including providing an interface between applications executed by the processor 1101 and various components of the communication device 1100, including the processor 1101, the memory 1102, and the communication module 1103. In various examples, the processor 1101 may perform communication operations and control the corresponding protocol stacks to communicate with external communication devices based on instructions provided by the operating system.

Furthermore, the memory 1102 may be configured to store device information indicating communication capabilities of external communication devices that the communication device 1100 may establish connections with and/or offload communication operations to. The device information may exemplarily include data rate information indicating the amount of data that each external communication device may transmit and/or receive for a period of time. The device information may include technology information indicating one or more communication technologies that an external communication device may use to transmit and/or receive communication signals. The device information may include mode information indicating one or more communication modes that an external communication device may use to transmit and/or receive communication signals. Exemplarily, communication modes for a WLAN communication technology may include WLAN communication within 2.4 GHz band providing most coverage at slower speeds, WLAN communication within 5 GHz band providing less coverage at faster speeds, and WLAN communication within 6 GHz band providing the least coverage at the fastest speeds. The device information may further include one or more communication protocols that external communication devices may use to communicate with the communication device 1100.

Furthermore, the memory 1102 may be configured to store application information indicating various attributes relating to data traffic of the applications. The application information may include a priority indicator designated for the application, or a type of application. Furthermore, the application information may include predefined data traffic information indicating a predefined amount of data to be exchanged by an application for a period of time. Furthermore, the application information may include predicted data traffic information indicating a predicted amount of data to be exchanged by an application for a period of time. It may be desirable to manage application-based offloading according to application information based on the situation, in particular, with respect to the availability of offload devices and their capabilities.

The illustrative example with respect to FIG. 11 may refer to a scenario, in which the communication device 1100 is a WLAN communication device that is configured to communicate according to the WLAN specification. Therefore, the communication module 1103 may include at least a WLAN transceiver configured to transmit and/or receive WLAN communication signals to communicate with one or more further WLAN communication devices, and in particular to communicate with an access point. The processor 1101 may be configured to perform operations according to at least the WLAN communication protocol. The skilled person would appreciate that various aspects provided here may be performed by various entities that are configured to operate according to other communication protocols in a similar manner.

Accordingly, the communication device 1100 may be connected to an access point to communicate with other communication devices, and in particular, with other communication devices that the communication device 1100 may send or receive application data. In various examples, the communication device 1100 may communicate with other communication devices that are not within the same WLAN network accessed directly by the access point. Such scenarios include when other communication devices are accessible over a connection to a WAN or an internet area network (IAN).

As indicated, the processor 1101 may be configured to execute a plurality of applications. In various examples, applications are software programs stored in the memory 1102 configured to provide various instructions and cause the processor 1101 to perform various operations to carry out one or more designated tasks. In particular, applications may exchange information to a layer (e.g. application layer) that is above the transport layer of a protocol stack configured according to an open system interconnection (OSI) model. Applications may cause the communication device 1100 to communicate with another communication device to transmit application data provided by the application or to receive application data provided by another communication device at a layer that is above the transport layer (e.g. application layer). In this constellation, the another communication device may similarly include an application configured to provide and or receive application data to/from a layer that is above the transport layer.

Illustratively, such applications may include a web application (e.g. a web browser and/or a webserver), an email application (e.g. an email server and/or an email client), a web storage application (e.g. a web storage client and/or a file server), a video conferencing application (e.g. a video conference client and/or a video conference server), a remote desktop application (e.g. a remote desktop client and/or a remote desktop server), etc. at which the communication device 1100 may be configured to communicate as a server or a client to transmit and/or receive data with respect to the application to another end of the communication (e.g. a target communication device) that another communication device includes.

The processor 1101 may offload communication activities for at least one of the applications to an external communication device. When the communication device 1100 offloads communication activities with respect to an application to an external communication device ("offload communication device"), the communication device 1100 may exchange data (send and/or receive) with respect to the application (i.e. application data) with the offload communication device. The offload communication device may transmit radio communication signals including the application data to the other communication device that the application data is addressed to, and may receive radio communication signals including the application data that the other communication device has transmitted.

The offload communication device may transmit and/or receive radio communication signals including the application data to/from a target communication device over the same access point that the communication device 1100 is connected to. The offload communication device may transmit and/or receive radio communication signals including the application data to/from a target communication device over another access point, or using another radio communication technology, that may be another short-range communication technology such as Bluetooth, or a cellular radio communication technology. In various examples, the offload communication device may transmit and/or receive radio communication signals according to any one of a local area network (LAN) communication protocol, a wireless local area network (WLAN) communication protocol, a Bluetooth protocol, a cellular communication protocol, or a satellite communication protocol The processor 1101 may determine the data to be transmitted by the offload communication device based on the application that provides the respective data for transmission or an instruction received from the application to transmit the respective data to a target communication device. In various examples, an application provides the respective data or the instructions at an application layer. Accordingly, the processor 1101 may perform functions of the protocol stack to transmit data including the application data of the respective application to the offload communication device over a connection established between the communication device 1100 and the offload communication device. For the data to be transmitted by the communication device 1100, the processor 1101 may perform functions of the protocol stack to transmit data to the target device over the access point.

In various examples, the processor 1101 may select an application from a plurality of applications to offload the communication activities for the application data of the respective application. The processor 1101 may select the application of which the communication activities with respect to its application data to be offloaded (i.e. offload application) based on the application information of running applications. The processor 1101 may select the offload application based on the application information of the applications causing the processor 1101 to schedule transmission and/or reception with respect to their respective application data.

The processor 1101 may encode offload communication data including the application data of an offload application for a transmission to the offload communication device. The processor 1101 may encode direct communication data including the application data of the applications that are not to be offloaded for a transmission over the access point. In various examples, the communication device 1100 may be configured to communicate with the access point and the offload communication device using different communication protocols. The processor 1101 may accordingly encode the offload communication data and the direct communication data according to respective communication protocol governing the respective connections between the communication device 1100 and the access point, and between the communication device 1100 and the offload communication device. In various examples, the encoded offload communication data may include an identifier (e.g. a traffic identifier) indicating the encoded offload communication data includes the application data to be transmitted by the offload communication device. The processor 1101 may use different traffic identifiers for each offload application when communication activities of multiple applications are offloaded.

The processor 1101 may further decode data including the application data received from the offload communication device according to the respective communication protocol governing the connection between the communication device 1100 and the offload communication device. The decoded data may include an identifier (e.g. a traffic identifier) indicating that the decoded data includes the application data of the offload application, and the processor 1101 may decode the respective application data based on the identifier. In cases, in which there are more than one offload application offloaded to one offload communication device, the identifier may further indicate the respective offload application.

Furthermore, the processor 1101 may further select one or more offload applications based on an indicator with respect to communication activities between the communication device 1100 and the access point. Such an indicator may include at least one of a bandwidth, an amount of data scheduled, current upload/download data rate, a predicted upload/download rate, number of retransmissions, a channel quality indicator, etc.

In various examples, the processor 1101 may assign an offload priority for one or more applications based on the application information. Furthermore, the processor 1101 may assign offload priorities for one or more applications based on a user-preference information in the memory 1102. A user may provide information with respect to its preferences (e.g. applications selected to offload, an order between applications, etc.) over the one or more applications to be offloaded.

Furthermore, the processor 1101 may further select one or more offload applications based on the device information indicating the communication capabilities of one or more external communication. The processor 1101 may match one or more offload applications with one or more external communication devices based on the device information of the respective external communication devices, the application information and/or the assigned offload priorities.

Furthermore, the processor 1101 may determine an external communication device to be used as the offload communication device based on the device information. The device information stored in the memory 1102 may include information indicating communication capabilities of a plurality of external communication devices with which the communication device 1100 may communicate over established connections. In various examples, the processor 1101 may determine an external communication device to be used as the offload communication device for one of the applications based on the application information and the device information.

The processor 1101 may further establish a connection with the offload communication device determined to offload communication activities with respect to an application. The processor 1101 may establish the connection with the offload communication device based on the device information. In such examples, the device information may include the necessary information to establish a connection with the respective offload communication device, such as supported communication technologies, protocols, modes, etc.

The processor 1101 may further control the communication activities of the offload communication device. The processor 1101 may control the communication activities of the offload communication device based on the device information and/or the application information with an intention to configure the communication activities based on the application information. For example, the processor 1101 may encode control information, and the offload communication device may be configured to configure the communication activities for the offload applications based on the control information received from the communication device 1100.

The control information may include an indication of a communication technology and/or a communication protocol and/or a communication mode that the offload communication device may use to transmit and/or receive radio communication signals including the application data to/from the target device. In various examples, the control information may further include an identifier or an address (e.g. a MAC address, an IP address, etc.) that the offload communication may use to communicate with the target communication device. Furthermore, the control information may further include the identifier (e.g. traffic identifier) used to identify the application data, or the data including the application data. The control information may further include an indication of the application.

Figure 12:
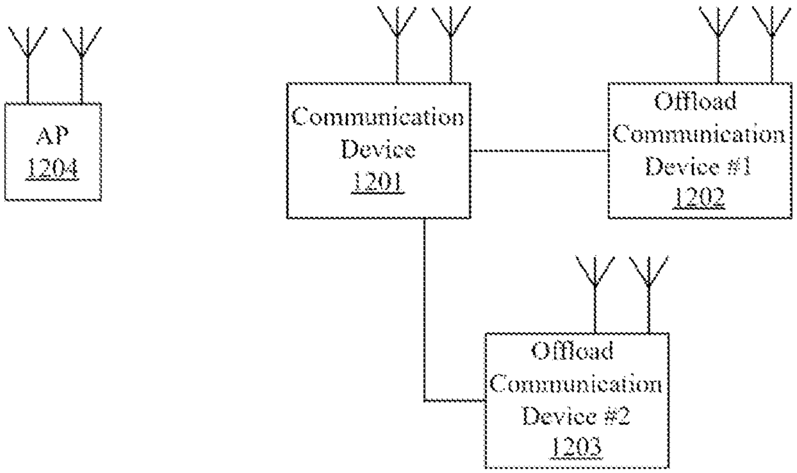
FIG. 12 shows an exemplary illustration of a communication system.

FIG. 12 shows an exemplary illustration of a communication system including a communication device 1201, a first offload communication device 1202, a second offload communication device 1203, and an access point (AP) 1204. The system may further include more communication devices, in particular, communication devices that the communication device 1201 may use as the offload communication device. In various examples, the communication device 1201 and/or the offload communication devices 1202, 1203 may include a communication device as exemplarily provided with respect to FIG. 11. In this illustrative example, the offload communication devices 1202, 1203 are communicatively coupled to the communication device 1201 over wired connections (e.g. USB connections).

The communication device 1201 may determine to offload communication activities with respect to applications that the processor of the communication device 1201 executes to the first offload communication device 1202 and the second offload communication device 1203. The illustrative example will be provided in a scenario in which the communication device 1201 may be a WLAN communication device and the AP 1204 may be a WLAN access point.

Applications that the processor of the communication device 1201 execute may cause the communication device 1201 to communicate with target communication devices. Each application may cause the communication device 1201 to receive and transmit radio communication signals to communicate with a target communication device. One or more target communication devices may not belong to the WLAN network with the communication device 1201. In various examples, data including the application data of an application may travel over multiple communication channels via multiple links between the communication device 1201 and the respective target communication device. With respect to direct communication data, one of the links includes the AP 1204, and with respect to offload communication data, one of the links includes the first offload communication device 1202 or the second offload communication device 1203.

Illustratively, the processor of the communication device 1201 may determine to offload communication activities with respect to a first application (e.g. a data storage application) to the first offload communication device 1202 and to offload communication activities with respect to a second application (e.g. a video conferencing application) to the second offload communication device 1203. Exemplarily, the device information may indicate that first offload communication device 1202 may perform communication operations using slower speeds but relatively reliable, and that the second offload communication device 1203 may perform communication operations that may be relatively suitable for real-time applications. The communication device 1201 may be in communication with the AP 1204 to receive and/or transmit radio communication signals including application data of the applications that are not offloaded.

The communication device 1201 may send information (e.g. control information) initiating the offload procedure. The information may include an indication for the respective offload communication device that an offloading task is assigned for a particular application. The information may further include a traffic identifier assigned to perform communication with respect to the application data of the particular application. The information may further include an identifier of the particular application (e.g. application ID, application name). The information may further include an information with respect to the target communication device that the respective communication device may communicate to transmit and/or receive the application data.

Exemplarily, the first offload communication device 1202 may perform communication operations with respect to the offload application for the first offload communication device 1202 using the WLAN communication over the AP 1204, and the second offload communication device 1203 may be a cellular communication device performing communication operations with respect to the offload application for the second offload communication device 1203 using a cellular communication over a mobile radio communication network. The communication device 1201 may configure one or more configuration parameters for the respective communication operations for the offload communication device. For example, since it may be desirable for the first application to communicate at slower speeds with a network having relatively better coverage, the communication device 1201 may send control information to configure the first offload communication device 1202 to connect to the AP 1204 using 2.4 GHz frequency band for WLAN.

The communication device 1201 may exchange respective application data with the first offload communication device 1202 and the second offload communication device 1203 by exchanging data including the respective application data according to USB protocol, since the USB protocol governs the communication between the devices. Accordingly, for sending the application data, the first offload communication device 1202 may decode received data according to the USB protocol to obtain the application data, and transmit WLAN communication signals including the application data to the AP 1204. The first Similarly, for receiving the application data, the first offload communication device 1202 may receive WLAN communication signals including the application data from the AP 1204 and encode data including the application data according to the USB protocol to send the application data to the communication device 1201.

In a similar manner, for sending the application data, the second offload communication device 1203 may decode received data according to the USB protocol to obtain the application data, and transmit cellular communication signals including the application data to a base station. Similarly, for receiving the application data, the second offload communication device 1203 may receive cellular communication signals including the application data from the base station and encode data including the application data according to the USB protocol to send the application data to the communication device 1201.

Figure 13:
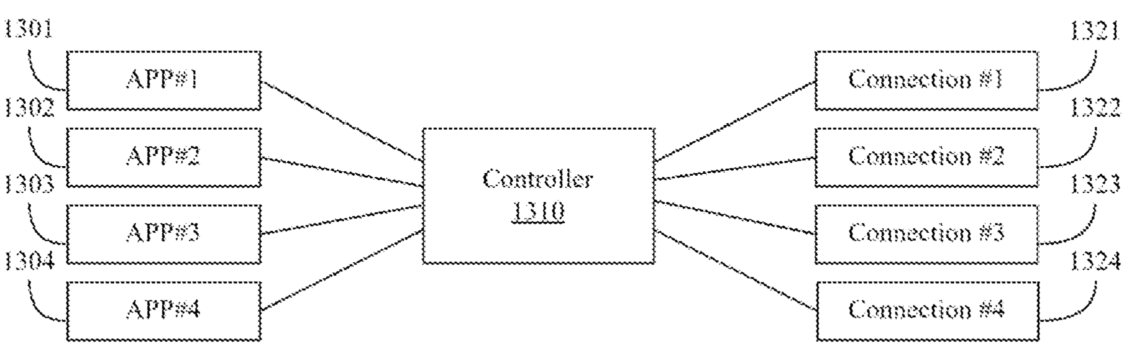
FIG. 13 shows an exemplary illustration with respect to control of communication operations with respect to the application data.

FIG. 13 shows an exemplary illustration with respect to control of communication operations with respect to the application data. The illustration includes a controller 1310 of a communication device, that a processor (e.g. the processor 1101) may implement, controlling how application data of multiple applications 1301, 1302, 1303, 1304, are communicated by the communication device based on the determination with respect to offloading communication operations of an application data to offload communication devices.

Illustratively, the first application 1301 may be a data storage application, of which the communication with respect to first application data is to be offloaded to a first offload communication device over a first connection 1321, the second application 1302 may be a video conferencing application of which the communication with respect to second application data is not to be offloaded and will be communicated by the communication device over a second connection 1322 to an AP, the third application 1303 may be a remote desktop application of which the communication with respect to third application data is to be offloaded to a second offload communication device over a third connection 1323, and the fourth application 1304 may be a productivity application of which the communication with respect to fourth application data is to be offloaded to a third offload communication device over a fourth connection 1324.

In such a scenario, the processor of the communication device may configure the first offload communication device to communicate with a first target device over 2.4 GHz WLAN connection, may configure the second offload communication device to communicate with a second target device over 6 GHz WLAN connection, may configure the third offload communication device to communicate using cellular wireless communication. The communication device may be connected to the AP over 5 GHz WLAN connection.

In a transmit mode of the communication device, the controller 1310 may receive application data of the applications 1301, 1302, 1303, 1304 and provide each application data for further processing operations by the processor to encode application data of each application to be transmitted using the assigned connection for the respective application including operations to encoding the application data according to the respective communication protocol governing the respective connection. In various examples, the controller 1310 may further provide a traffic identifier for at least the application data of the applications of which the communication is offloaded to an offload communication device. In various examples, the processor may encode the application data of offload applications within data packets, and each data packet may include the assigned traffic identifier of the respective application.

In a receive mode of the communication device, the controller 1310 may receive application data from further processing operations of the processor decoding received data over the respective connections. The controller 1310 may further receive the traffic identifier with the received application data and provide the respective application data to the respective application based on the respective traffic identifier and/or the respective connection used to receive the application data.

WLAN communication technology provides an infrastructure for various communication modes, in particular with respect to network topologies between WLAN communication devices, such as basic service set (BSS) in which WLAN communication devices may communicate over an access point, an extended service set (ESS) in which WLAN communication devices may communicate over multiple access points, an independent basic service set (IBSS) in which WLAN communication devices may communicate over ad-hoc connection with each other. Furthermore, Wi-Fi Direct (Wi-Fi P2P) allows communication between two WLAN communication devices without an external access point. In accordance with various aspects of this disclosure, two communication devices (e.g. a communication device and an offload communication device) may communicate over an established P2P connection to exchange application data.

Figure 14:
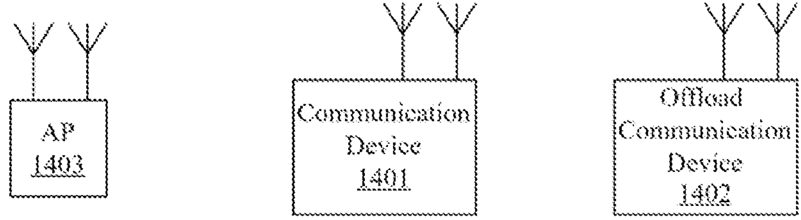
FIG. 14 shows an exemplary illustration of a communication system.

FIG. 14 shows an exemplary illustration of a communication system including a communication device 1401, an offload communication device 1402, and an access point 1403. The system may further include more communication devices, in particular, communication devices that the communication device 1401 may use as the offload communication device. In various examples, the communication device 1401 and/or the offload communication device 1402 may include a communication device as exemplarily provided with respect to FIG. 11. In this illustrative example, the communication device 1401 and the offload communication device 1402 may communicate over an established P2P connection with each other to exchange the application data.

Based on the determination of offloading communication activities of an application to the offload communication device 1402, the communication device 1401 may send information indicating that application data of the application is to be offloaded by the offload communication device 1402 to the offload communication device 1402. In various examples, there may be already an established P2P connection with the offload communication device. The communication device 1401 may establish a P2P connection with the offload communication device 1402 in response to the determination, or in response to sending the information over the WLAN connection according to the basic service set (BSS) via the AP 1403, or in response to received acknowledgement information from the offload communication device 1402 over the WLAN connection within the BSS.

The communication device 1401 may be configured to transmit and/or receive WLAN communication signals including the offload communication data to the offload communication device 1402 over the established P2P connection. Furthermore, the communication device 1401 may be configured to transmit and/or receive WLAN communication signals including the direct communication data to the AP 1403.

In various examples, the communication module of the communication device 1401 may include a first circuit including a first RF transceiver configured to transmit and/or receive radio communication signals to/from the offload communication device 1402 over the established P2P connection and a second circuit including a second RF transceiver configured to transmit and/or receive radio communication signals to/from the AP 1403 within the BSS. The circuits may further include respective protocol processors and DSPs coupled to the respective RF transceivers to maintain both connections simultaneously. The communication device 1401 may include more circuits to maintain more connections simultaneously. The communication device 1401 may transmit and or receive radio communication signals as exemplarily provided with respect to FIG. 13.

In accordance with various aspects of this disclosure, the communication device 1401 may be configured to allocate resources to transmit and/or receive radio communication signals including offload communication data via a first P2P connection that is established with the offload communication device 1402 and to transmit and/or receive radio communication signals including direct communication data over a second WLAN connection that is established with the AP 1403 in a coexisting manner. In accordance with various aspects of this disclosure, the communication device 1401 may perform operations as provided with respect to FIGS. 22 and 23.

Figure 15:
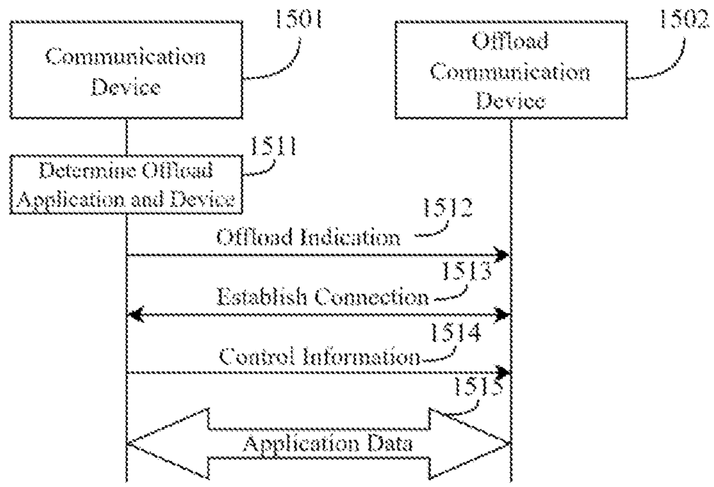
FIG. 15 illustrates an example of an offload procedure between a communication device and an offload communication device.

FIG. 15 illustrates an example of an offload procedure between a communication device and an offload communication device. A processor of the communication device 1501 (e.g. the communication device 1401) may determine 1511 to offload communication activities with respect to an application configured to exchange application data with a target device to an offload communication device 1502. In response to the determination, the processor of the communication device 1501 may assign the application as the application to be offloaded to the offload communication device 1502 and may define the offload communication device 1502 as a secondary device. As indicated, the processor may determine to offload based on the application information and/or the device information. In response to the determination, the communication device 1501 may send 1512 a message to the offload communication device 1502 indicating that the communication activities with respect to the application is to be offloaded.

In various examples, the communication device 1501 may also indicate the application and the target device within the message, so that the offload communication device 1502 may encode and/or decode the application data to transmit and/or receive radio communication signals based on the application and the target device. In various examples, the communication device 1501 may encode the application data using layer functions of a first portion layers within the protocol stack (e.g. up to a transport layer, a logical link control layer, etc.), the offload communication device 1502 may receive the encoded data and the processor of the offload communication device 1502 may transmit radio communication signals including the application data by using layer functions of a second portion layers within the protocol stack (e.g. by using MAC and PHY functions) on the received data based on the received message. Accordingly, the message may include necessary information to move the data sent by the communication device 1501 may move through the second portion layers of the protocol stack. Similarly, for the decoding part the offload communication device 1502 may use functions of the second portion layers of the protocol stack for radio communication signals including the application data, and the communication device 1501 may use functions of the first portion layers of the protocol stack for the data including the application data received from the offload communication device 1502.

Furthermore, in case there is no established direct connection (e.g. P2P connection) between the communication device 1501 and the offload communication device 1502, either the communication device 1501 or the offload communication device 1502 may send a connection request to establish a connection 1513. Particularly with respect to a WLAN P2P connection, one of the connected devices may be configured to take a role of a group owner (GO) and the other device(s) may be configured to take a role of a group client (GC). The offload communication device 1502 or the communication device 1501 may take the role of the GO to configure communications in-between.

The connection established between the communication device 1501 and the offload communication device 1502 may be a secure connection. For this purpose, the established connection may be established using pass-phrases or a pass-key to secure the connection. In various examples, each device may be configured to use a tunneling procedure to secure the connection.

Furthermore, the communication device 1501 may determine parameters to configure the communication operations with respect to the offload application based on the application information and/or the device information. Accordingly, the communication device 1501 may send 1514 control information to the offload communication device 1502 to control at least one of the communication technology, the communication protocol, and/or the communication mode (e.g. by indicating to use 2.4 GHz, 5 GHz, cellular communication, etc.). In response to receiving the control information, the processor of the offload communication device 1502 may configure communication operations to be performed to transmit and/or receive radio communication signals based on the received control information.

Accordingly, the communication device 1501 and the offload communication device 1502 may exchange 1515 the application data in both transmit and receive mode, in which the communication device 1501 provides data including the application data to the offload communication device 1502, with which the offload communication device 1502 transmits radio communication signals including the application data in the transmit mode, and in which the offload communication device 1502 receives radio communication signals including the application data and sends data including the application data to the communication device 1501, with which the processor of the communication device 1501 provides the application data (or an instruction with respect to the received application data) to the offload application. Accordingly, the offload application may access and use the received application data.

In various examples, the devices may communicate over a designated logical port to exchange the application data.

Accordingly, the devices may communicate by exchanging the application data over the designated logical port. In such example, the data including the application data may be transferred as a data stream. In various examples, the data including the application data may be a packetized data having a payload section including portions of the application data.

Figure 16:
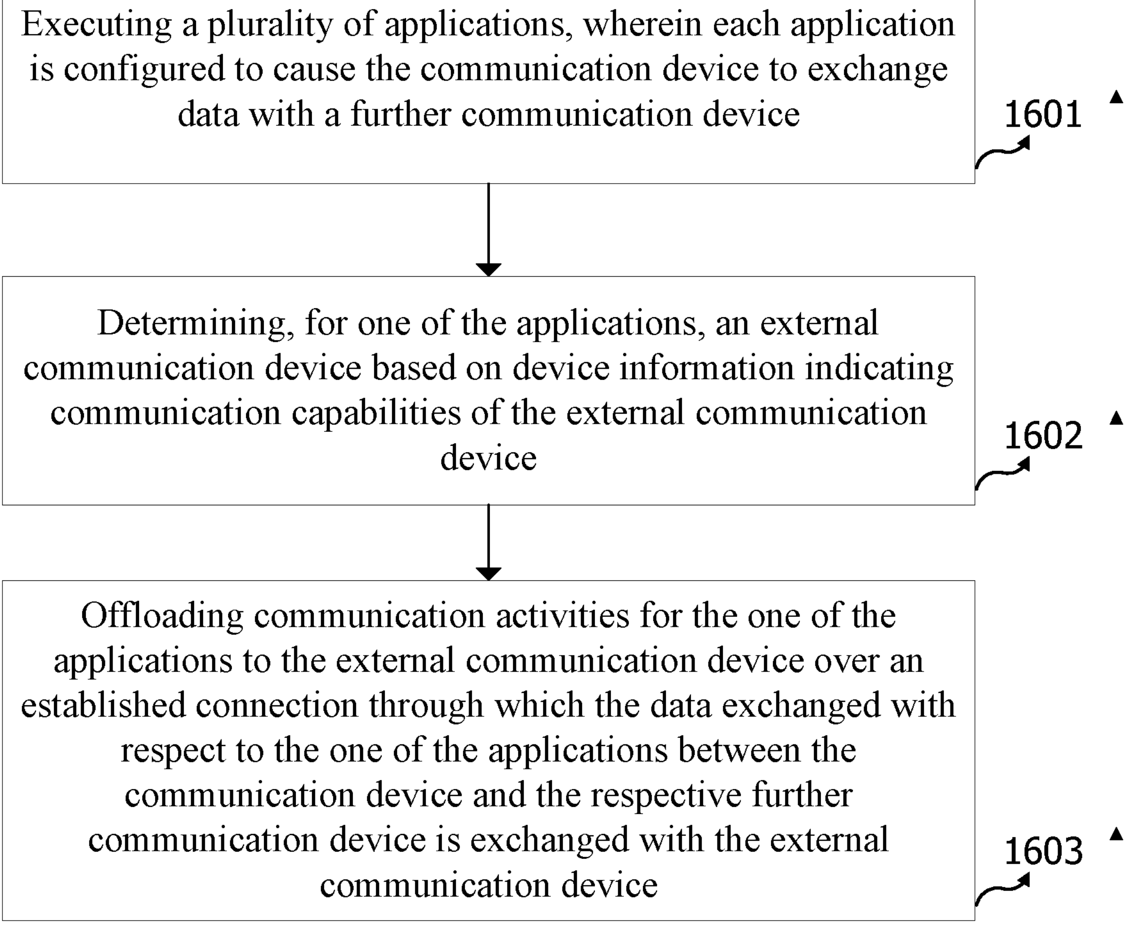
FIG. 16 shows an example of a method.

FIG. 16 shows an example of a method. The method may include executing 1601 a plurality of applications, wherein each application is configured to cause the communication device to exchange data with a further communication device, determining 1602, for one of the applications, an external communication device based on device information indicating communication capabilities of the external communication device, and offloading 1603 communication activities for the one of the applications to the external communication device over an established connection through which the data exchanged with respect to the one of the applications between the communication device and the respective further communication device is exchanged with the external communication device.

In accordance with various aspects of this disclosure, a communication device may implement various mirroring technologies in which mirroring content that may include video content and audio content that are encoded and sent by a source device (e.g. a computer, a smartphone, etc.) is displayed at a sink device (a display, a screen). There are various standards and protocols used to transfer the mirroring content to be displayed from a source device to a sink device, such as Miracast which is based on transmitting the mirroring content over a P2P connection (in particular Wi-Fi Direct).

Various mirroring technologies may further support displaying the content interactively, in particular a possibility for a user to interact with the mirroring content using an input device at the sink device, and sink device sending instructions with respect to received instructions to be transmitted to the source device over the connection. Such instructions may cause the source device to make adjustments with respect to the content, such as adjusting the video content, the audio content, and/or the data content. The data content may exemplarily include information with respect to the content or interaction possibilities with the video content and/or the audio content (e.g. quality, subtitles, information presented on the sink device, etc.).

In various aspects, a communication device may receive data streams including the mirroring content from a plurality of source devices, and combine at least the video content to cause a sink device to display multiple video contents received from the plurality of source devices simultaneously. For example, it may be desirable to display the mirroring content including mirrored screen of various devices that a user may want to access simultaneously. For example, a user may want to access screens of multiple user devices (e.g. a desktop computer, a smartphone, a tablet computer) simultaneously by transferring the data representing their screen. In various examples, the communication device itself may be the sink device, or the communication device may further communicate with the sink device to provide the combined mirroring content. In certain uses cases, it may be desirable to display the multiple mirroring contents on one display to conserve energy instead of displaying them on multiple displays.

Furthermore, it may be desirable for the communication device to provide necessary instructions indicating interactions received with respect to one of the mirroring contents over the combined mirroring content to the respective source device providing the corresponding mirroring content. In various examples, the communication device may further include an input device to receive and/or detect interactions with the combined mirroring content displayed on a display.

In various examples, the communication device may adjust how the mirroring contents are combined based on a received interaction. Exemplarily, the communication device may receive eye-tracking sensor data indicating the gaze of a user and adjust sizes of the regions within the combined mirroring video content where one of the mirroring video content is provided within each region. For example, the communication device may combine the mirroring video contents in a manner that the mirroring content that the user looks has the largest region within the combined mirroring video content.

In accordance with various aspects of this disclosure, a communication device may combine screen capture videos obtained from screen mirroring data streams of multiple source devices to obtain a combined screen capture video. Furthermore, the communication device may receive information with respect to an interaction with one of the screen capture videos and send instructions to the source device that provided the respective screen capture video. In various examples, the communication device may be an intermediary device between the source devices and a sink device. In various examples, the communication device may be a sink device. The communication device may further be equipped with an eye-tracking sensor and adjust the size of each of the screen capture videos within the combined screen capture video based on received eye-tracking sensor data.

Figure 17:
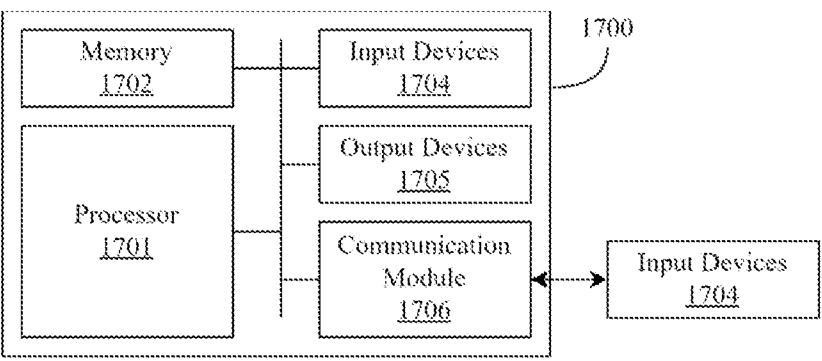
FIG. 17 shows an example of a communication device.

FIG. 17 shows an example of a communication device. The communication device 1700 includes a processor 1701. The processor 1701 may include a central processing unit, a graphics processing unit, a hardware acceleration unit, a neuromorphic chip, and/or a controller. The processor 1701 may be implemented in one processing unit, e.g. a system on chip (SOC), or an integrated system or chip. The processor 1701 may include one or more processors. The communication device 1700 may further include a memory 1702 to store data. The memory 1702 may store an operating system (not shown) including instructions configured to manage various operations of the processor 1701, the memory 1702, and the communication module 1706, and may further manage operations of the input devices 1704, the output devices 1705, and the internal interface 1703. The processor 1701 and memory 1702 (and also other various components of the device) and other entities may be communicatively coupled over an internal interface 1703 to communicate with each other (e.g. a bus, wires, etc.).

The communication device 1700 may further include one or more input devices 1704 that are coupled to the internal interface 1703. The communication device 1700 may further include a communication module 1706 (e.g. the communication module 403, the communication module 1103) configured to communicate with a plurality of other communication devices. In various examples, the communication device 1700 may be communicatively coupled to one or more input devices 1704.

The input devices 1704 may provide an input, in particular with respect to an interaction with a user. Exemplarily, a mouse may be one of the input devices 1704 delivering user interactions for moving a pointer via hand movements or pressing keys, a keyboard may be an input device 1704 delivering user interactions by receiving keystrokes, a microphone may be an input device 1704 delivering user interactions through audio signals, a touchpad may be an input device 1704 delivering user interactions by receiving touch inputs, etc.

Furthermore, an input device 1704 may be, or may include, various types of sensors that are configured to detect an interaction. Such sensors may include image sensors (cameras), and/or accelerometers, and/or speedometers, and/or altimeters, and/or gyroscopes, and/or velocity sensors, and/or proximity sensors, and/or light sensors (e.g. ambient light sensor), and/or fingerprint sensors, and/or near field communication (NFC) sensors. These devices are provided only as examples.

In accordance with various aspects, an eye tracker (i.e. eye-tracking sensor) may be one of the input devices 1704 providing eye-tracking information (e.g. eye-tracking sensor data) with respect to the gaze of a user, or motion information with respect to eye movements of a user, that may include eye movements relative to the head of the user. It may be desirable to employ an eye tracker especially, to monitor where the user is looking on a display, e.g. in which region of the displayed content.

The communication device 1700 may further include one or more output devices 1705 to provide an output. Alternatively, or additionally, the interface 1703 may be communicatively coupled to the output devices 1705. The interface 1703 may be coupled to the output devices 1705 via the communication module 1706 as well. The interface 1703 may be coupled to the output devices 1705 electrically or communicatively (e.g. via a wired or wireless connections) to provide an output. The communication module 1706 may also manage the communication between the communication device 1700 and other output devices 1705 that are communicatively coupled to the communication device 1700 via the communication module 1706.

Accordingly, within various aspects of this disclosure, the communication device 1700 may receive various information from the input devices 1704 and transmit various information to the output devices 1705. In various examples, the communication device 1700 may include the corresponding input or output device, or the communication device 1700 may be communicatively coupled to the corresponding input or output device over the communication module 1706.

Furthermore, a device may be both an input device and an output device for the communication device 1700 within this context. For example, one of the input/output devices may include a display. The display may be configured to provide a visual output to a user. Furthermore, the display may include a touch screen display that is configured to receive an input from the user interacting with the display. The contact interaction from the user may be detected by a touch input unit. The touch input unit may be configured to detect the interaction of the user with the display via a contact of the user. The touch input unit may be configured to detect contact and/or movement of the user (e.g. via a finger, via a stylus, etc.,) while touching the display. Alternatively, the touch input unit may be configured to detect the interaction of the user via another defined surface. For example, the touch input may include a touchpad that is configured to receive input from the user. Accordingly, the display may be both an example of an input device and an output device.

The communication module 1706 may manage any type of communication with other devices (e.g. input devices 1704 or output devices 1705) for the communication device 1700. The communication module 1706 may be communicatively coupled to the other devices (via wired or radio communication), and the communication module 1706 may provide the data received from the other devices to the interface 1703. The communication module 1706 may receive the data over a communication network or via P2P connections (e.g. Wi-Fi Direct) from the other devices. Furthermore, the communication module 1706 may transmit data to the other devices. The communication module 1706 may support any one or more of the communication protocols or communication technologies, some of which are exemplarily provided in this disclosure.

The processor 1701 may be configured to perform various operations according to a screen mirroring protocol. Typically, operations according to a screen mirroring protocol may include controlling the communication module 1706 to receive radio communication signals including a mirroring data stream, decoding the mirroring data stream according to the respective protocol to obtain a mirroring content (e.g. video content, audio content, information content), and providing an output (e.g. display data, audio signal) with respect to the obtained mirroring content.

In accordance with various aspects of this disclosure, the communication device 1700 may be communicatively coupled to one or more source devices and/or one or more sink devices. Source devices may provide data streams including videos representing mirrored screen of each source device. Sink devices may receive data streams and display the videos. The communication module 1706 may receive radio communication signals carrying data streams for each source device of multiple source devices, and each data stream may include video data representing a mirrored screen of the respective source device.

The processor 1701 may decode the data streams received from multiple source device to obtain a video content of each source device. The processor 1701 may further combine the videos to obtain a combined video including multiple designated regions, and the processor 1701 may combine the videos in a manner that at least a portion of the video of one of the source devices is provided within each region. In various examples, the regions are non-overlapping regions allowing the presentation of respective videos of each sources without any overlap.

In various examples, the communication device 1700 may also generate display data including a plurality of images representing the visual content (e.g. a screen) provided by the communication device 1700 itself. For example, a display driver of the operating system of the communication device 1700 may output the display data to be displayed on a display. In such example, the processor 1701 may obtain the combined video in a manner that one of the regions of the combined video includes communication device video representing the visual content of the communication device 1700. The processor 1701 may encode the data representing the visual content to obtain the communication device video.

Furthermore, the processor 1701 may receive information indicating an input interaction provided by one of the input devices 1704 representing an interaction of a user with respect to one of the designated regions being the interacted region. The processor 1701 may determine a target source device being the source device providing the video within the interacted region. The processor 1701 may encode an input message indicating the received interaction with respect to the interacted region for a transmission to the target source device.

The input message may include an indication of a key event representing a keystroke or an interacted designated button received from the input devices 1704 with respect to the respective designated region. The input message may include an indication of a pointer event representing the location of a pointer within the respective designated region received from the input devices 1704. A pointer event may further include a state of designated buttons within the respective designated region. The input message may include a touch event representing a touch input within the respective designated region received from the input devices 1704. The input message may further include a sink status event indicating a status of the sink devices for sink device features. The input message may further include a user interface blocking event representing that at least a portion of the region is blocked. The input message may include an audio blocking event or a sink cut text event.

The communication device 1700 may be configured to receive radio communication signals including the data streams of multiple source devices over the established P2P connections. The communication module 1706 may include a first circuit including a first RF transceiver configured to transmit and/or receive radio communication signals to/from a first source device over a first P2P connection and a second circuit including a second RF transceiver configured to transmit and/or receive radio communication signals to/from a second source device over a second P2P connection. The circuits may further include respective protocol processors and DSPs coupled to the respective RF transceivers to maintain both connections simultaneously. The communication module 1706 may include more circuits to maintain more connections simultaneously. In various examples, the communication device 1700 may be a WLAN communication device, and the communication device 1700 may further communicate with an AP within the respective WLAN network.

In accordance with various aspects of this disclosure, the communication device 1700 may be configured to allocate resources to transmit and/or receive radio communication signals from multiple source devices over one or multiple P2P connections and to transmit and/or receive radio communication signals over a WLAN connection that is established with the AP in a coexisting manner. In accordance with various aspects of this disclosure, the communication device 1700 may perform operations as provided with respect to FIGS. 22 and 23.

Figure 18:
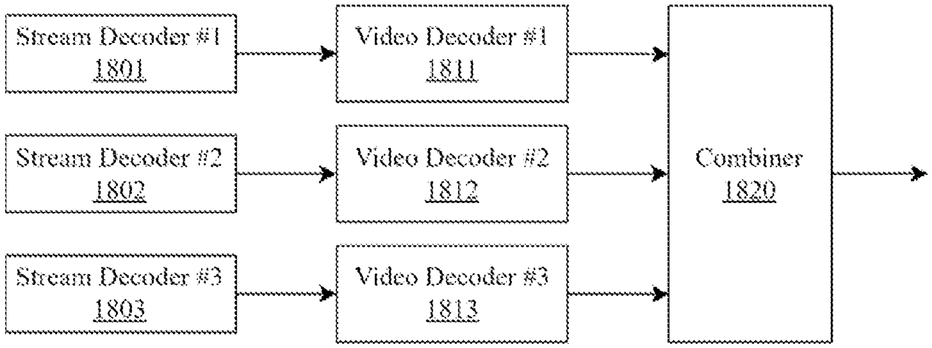
FIG. 18 shows an exemplary illustration with respect to processing of data streams received from multiple source devices.

FIG. 18 shows an exemplary illustration with respect to the processing of data streams received from multiple source devices. A communication device (e.g. the communication device 1700) may receive a first data stream from a first source device, a second data stream from a second source device, and a third data stream from a third source device. In various examples a processor (e.g. the processor 1701) may process the received data streams to obtain a combined video. Accordingly, stream decoders, video decoders, and the combiner illustratively provided in this example may be implemented by the processor. In this illustrative example, three pairs of stream decoders and video decoders are provided, but a communication device may include less or more pairs to process the data streams received from multiple source devices.

The first stream decoder 1801 may receive the first data stream, the second stream decoder 1802 may receive the second data stream, and the third stream decoder 1803 may receive the third data stream. A stream decoder may decode received data streams to obtain video data provided within the received data stream. There are various protocols and standards defining different methods and ways, in particular with respect to how a mirroring content (e.g. video data, audio data, information) is communicated between a source device and a sink device. Accordingly, a stream decoder may be configured to decode the received data stream according to a designated mirroring protocol with the source device.

Each stream decoder 1801, 1802, 1803 may provide an output including video data with respect to the mirrored content of the respective source device. Accordingly, a first video decoder 1811 may receive first video data representing the video content of the first source device, a second video decoder 1812 may receive second video data representing the video content of the second source device, and a third video decoder 1813 may receive third video data representing the video content of the third source device. Furthermore, each stream decoder 1801, 1802, 1803, may also provide an output with respect to audio content or information provided by the respective source device to another entity configured to process the audio content or information.

A video decoder may decode received video data to obtain video that the received video data represents. Analogous to the situation at the stream decoders, various protocols and standards may support different video technologies and/or types, and each video decoder may be configured to decode received video data to obtain the video according to a particular video decoding method (e.g. H.264, H.265, etc.). Each video decoder 1811, 1812, 1813 may provide an output including video provided by the respective source device to a combiner 1820.

The combiner 1820 may be configured to combine each video received from the video decoder 1811, 1812, 1813 to obtain a combined video. The combiner 1820 may be configured to obtain the combined video with a predefined resolution. The predefined resolution may be stored in a memory or may be determined and set according to features of the display of a sink device that is going to display the combined video. In a case that a combined video includes a communication device video, the combiner 1820 may further receive a video that is encoded according to display data of the communication device.

The combiner 1820 may allocate multiple non-overlapping regions and output a combined video having multiple non-overlapping regions, wherein one of the videos are provided within each non-overlapping region. In various examples, the combiner 1820 may allocate each region based on a predefined configuration indicating the sizes (e.g. number of pixels for each dimension) to be allocated for the regions. In various examples, the combiner 1820 may allocate the size of each of the regions based on the resolution and/or aspect ratio of each video. In various examples, the combiner 1820 may allocate the size of each region based on the predefined resolution of the combined video. The combiner 1820 may include a scaler to scale each video according to the size of the allocated region.

Furthermore, the combiner 1820 may allocate the size of at least one region based on eye-tracking information received from an input device including an eye-tracker. In such scenario, the eye-tracking information may provide an indication to the processor that the user gazes to an interacted region. Responsive to the eye-tracking information, the combiner 1820 may adjust the size that is allocated for the interacted region by increasing the size of the interacted region. In a constellation that each region size may depend on other region sizes with a limitation provided with the predefined resolution, the combiner 1820 may also adjust the sizes of non-interacted regions by decreasing the size of the non-interacted regions.

Furthermore, the scaler may be configured to scale the size of the video provided within the interacted region based on the eye-tracking information by changing the scaling applied for the video of the interacted region. Similarly, the scaler may also adjust the scaling applied for videos of non-interacted regions based on the eye-tracking information. In various examples, the scaler may adjust the scaling applied for the videos of non-interacted regions based on the adjusted sizes of their respective regions. In various examples, the size of an interacted region remains the same, but the scaler may scale the size of the video within the interacted region based on the eye-tracking information to zoom in on a particular portion of the video within the allocated region.

In one example, the combiner 1820 may allocate a large-sized region that is larger than other allocated regions of the combined video. In one example, the size of the large-sized region may be fixed and the location (e.g. pixel coordinates) of the large-sized region relative to the first pixel of the combined video may be fixed. The combiner 1820 may provide the combined video including multiple other regions and a large-sized region, and the video provided within the large-sized region may be determined based on the eye-tracking information. Exemplarily, the combiner 1820 may combine videos in a manner that the video provided in an interacted region is moved to the large-sized region.

Furthermore, the combiner 1820 may output combined video information indicating the allocated sizes of each region, the scaling applied for each video, and/or coordinate information with respect to each region (e.g. coordinates of boundaries, coordinates to be used as a reference point (e.g. top-left corner), etc.) which may be stored in a memory. The processor of the communication device may further be configured to determine the target source device based on an interaction indicated by an input device and the combined video information, as it may be desirable to determine the target source device based on an interaction with the combined video. For example, the interaction may indicate an interaction with a particular portion of the combined video, and the processor may determine the target source device according to the interaction based on the combined video information indicating the video-region mappings. Furthermore, the interaction may be translated for the source device, as the sizes of the videos may be scaled.

Figure 19:
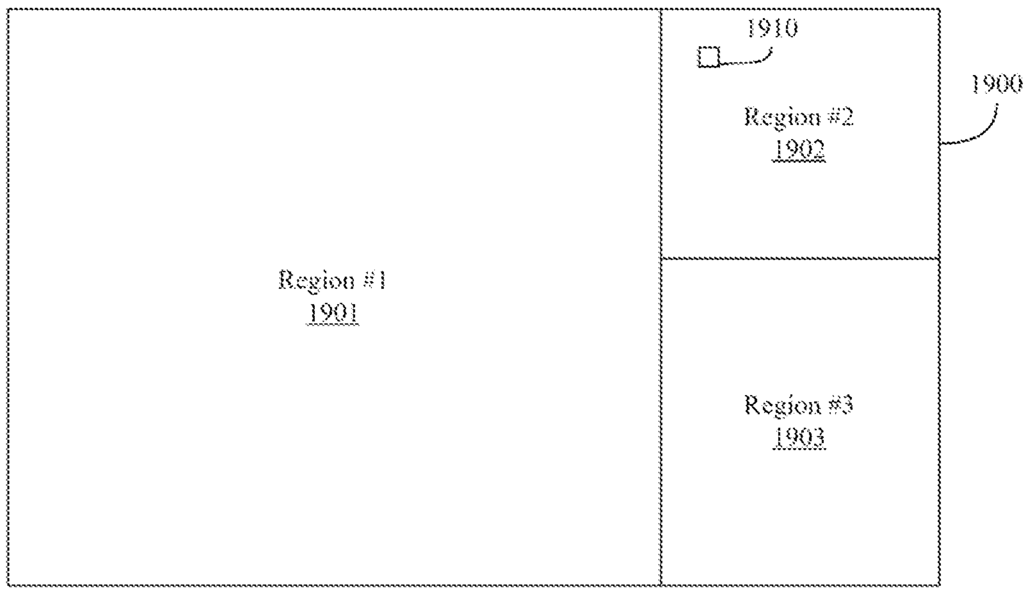
FIG. 19 shows an example illustrating regions with respect to a combined video.

FIG. 19 shows an example illustrating regions with respect to a combined video. Exemplarily, a communication device (e.g. the communication device 1700) may receive a first mirroring stream from a first source device to obtain a first video and a second mirroring stream from a second source device to obtain a second video. In this illustrative example, the processor of the communication device may combine videos to obtain the combined video 1900 to be displayed on a display. The combined video may include a first region 1901 having a first set of dimensions in which the first video is provided and a second region 1902 having a second set of dimensions in which the second video is provided. A third region 1903 having a third set of dimensions may include the communication device video based on the display data of the communication device.

Based on eye-tracking information, exemplarily indicating a user interaction (e.g. gaze) with the second region 1902, a combiner (e.g. the combiner 1820) may adjust the dimensions of the second region by making the second region bigger. Furthermore, a scaler may also adjust the scaling with respect to the second video to increase the size of the second video. The combiner may also adjust the sizes of other regions and the scaler may scale videos of other regions accordingly to obtain the combined video 1900 with the same size.

Figure 20:
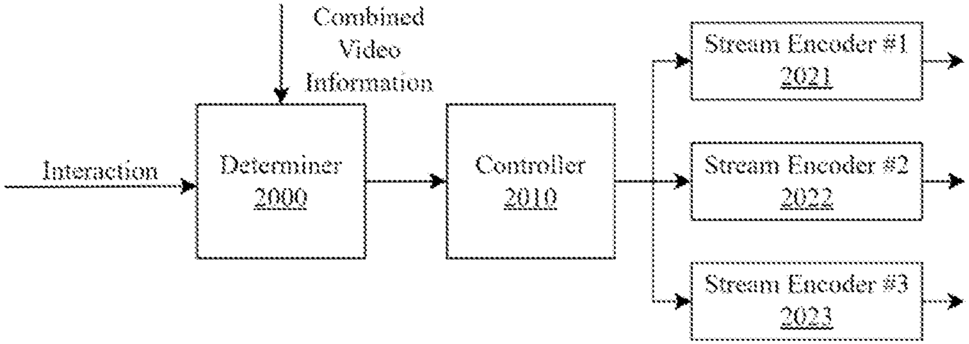
FIG. 20 shows an exemplary illustration of various processing blocks of a processor.

FIG. 20 shows an exemplary illustration of various processing blocks of a processor. In various examples, a processor (e.g. the processor 1701) of a communication device (e.g. the communication device 1700) may implement various functions provided in this disclosure with respect to these processing blocks. In accordance with various aspects of this disclosure, the processor may encode the input message based on an input interaction received from one of the input devices.

A received interaction may include an interaction with the combined video. A user may interact with the combined video that is displayed on a display of the communication device using various input devices. Exemplarily, an interaction with an input device may include moving pointer, hovering over, or clicking (e.g. a mouse), or it may include key strokes, audio inputs, etc. over the combined video, causing interaction information (e.g. signals or data) with which the processor of the communication device may determine the object or and/or the coordinates of the combined video that are interacted with.

A determiner 2000 may receive the interaction information indicating an interaction with a combined video having multiple regions, in which each region includes a video of a source device, and determine a region that is interacted (interacted region) from the multiple regions based on the interaction information. The determiner 2000 may determine a source device from multiple source devices providing the videos within the combined videos based on the received interaction information. Based on the determination of the source device, the determiner 2000 may provide information to a controller 2010 indicating the source device, so that the controller 2010 may control one or more stream encoders 2021, 2022, 2023 to encode an input message for that determined source device indicating the interaction.

In accordance with various aspects, the videos of the combined video may include videos received from the source devices, and the videos may be scaled or be located at regions that are located in various regions of the combined video, resulting in that an indication of the received interaction may cause a mismatch and/or a false interaction indication at the source device. For example, in a case that the received interaction information indicating an interaction with respect to particular coordinates of the combined video, the interacted coordinates of the combined video should be mapped to coordinates of the video that is provided in its respective region including the interacted coordinates.

Illustratively, referring back to FIG. 19 collectively, the interaction information may indicate an interaction with interacted coordinates 1910, which the respective coordinates are provided according to the combined video 1900 (e.g. coordinates relative to top left corner of the combined video). The determiner 2000 may determine that the interacted region is the second region 1902 and provide information indicating the first source device, so that the controller 2010 may control one or more stream encoders 2021, 2022, 2023 to encode an input message to the first source device. Furthermore, the determiner 2000 may also map the respective coordinates that are provided according to the combined video (e.g. coordinates relative to top left corner of the combined video) to first video coordinates according to the first video (e.g. coordinates relative to top left corner of the first video that is provided within the combined video, or coordinates relative to top left corner of the second region 1902).

In various examples, the determiner 2000 may map the received interaction information to a mapped interaction information based on combined video information that a combiner (e.g. the combiner 1820) provides. The combined video information may include information indicating the allocated sizes of each region, the scaling applied for each video, coordinate information with respect to each region (e.g. coordinates of boundaries, coordinates to be used as a reference point (e.g. top left corner), etc.). In various examples, the combined video information may include the combined video. In various examples, the determiner 2000 may obtain mapped interaction information based on a received interaction information at a first instance of time (e.g. past instance of time) and the combined video of a second instance of time (e.g. current combined video that is currently combined and/or displayed).

Accordingly, the determiner 2000 may also provide the received interaction information and/or the mapped interaction information to the controller 2010 or to one or more stream encoders 2021, 2022, 2023. The one or more stream encoders 2021, 2022, 2023 may encode an input message including the received interaction information and/or the mapped interaction information for a transmission to a source device indicated by the controller 2010. In this example, a first stream encoder 2021 is allocated to encode messages to the first source device. Accordingly, based on the mapped interaction information and the output of the controller 2010, the first stream encoder 2021 may encode an input message including the mapped interaction information for a transmission to the first source device. As previously indicated stream encoders may encode information based on the protocol used to communicate with respective source devices.

FIG. 21 shows an example of a communication system. The communication system includes a communication device 2100 (e.g. the communication device 1700) configured to combine videos received from one or more source devices 2111, 2112, as provided with respect to various aspects of this disclosure. In various examples, the communication device 2100 may include a display that is configured to display the combined video. In various examples, the communication device 2100 may be an intermediate device between the source devices 2111, 2112 and a sink device 2120. A processor of the communication device 2100 may be configured to encode the combined video according to a screen mirroring protocol (e.g. Miracast, Airplay, Googlecast, etc.) and to transmit radio communication signals including the combined video to the sink device 2120. In various examples, the processor may be configured to encode the combined video according to a protocol to send display data (e.g. USB, HDMI) to an output device including a display. Furthermore, the communication device 2100 may be communicatively coupled to input devices over the sink device 2120. In particular, the sink device 2120 may include an eye-tracker providing eye-tracking information, and the communication device 2100 may receive eye-tracking information from the sink device 2120.

In various examples, the communication device 2100 may be a WLAN communication device configured to transmit and receive radio communication signals according to a WLAN communication protocol, and the communication device 2100 may be configured to establish a WLAN connection with an AP 2130. In accordance with various aspects of this disclosure, the communication device 2100 may be further configured to receive data streams including videos from the source devices 2111, 2112 over established one or more P2P connections. The P2P connections may be WLAN P2P connections (Wi-Fi Direct connections). The illustrative example is provided in a manner that the communication device 2100 communicates over a first P2P connection with a first source device 2111, communicates over a second P2P connection with a second source device 2112, communicates over a third P2P connection with a sink device 2120, and communicates over a fourth WLAN connection (e.g. BSS mode) with an AP 2130.

The processor of the communication device 2100 may configure communication operations to maintain connections with other devices via various methods. In particular, the communication device may configure communication operations with respect to the connections between the sink device 2120 and the communication device (over an established P2P connection, or alternatively via the AP in another example) based on a received configuration information from the sink device 2120. It may be desirable for the sink device 2120 to control communication operations with the communication device 2100.

Accordingly, the configuration information may indicate a communication technology, or a communication protocol, or a mode to be used in particular communication technology and/or protocol, and the communication device 2100 may configure communication operations with the sink device 2020 based on decoded configuration information.

The communication device 2100 may be configured to receive radio communication signals including the data streams from the source devices 2111, 2112 over the respective P2P connections. The communication module 1706 may include a first circuit including a first RF transceiver configured to transmit and/or receive radio communication signals to/from a first source device 2111 over the first P2P connection and a second circuit including a second RF transceiver configured to transmit and/or receive radio communication signals to/from the second source device 2112 over the second P2P connection. The circuits may further include respective protocol processors and DSPs coupled to the respective RF transceivers to maintain both connections simultaneously. The communication module of the communication device (e.g. the communication module 1706) may include more circuits to maintain more connections simultaneously (e.g. with the AP 2130 and/or the sink device 2120).

In accordance with various aspects of this disclosure, the communication device 2100 may be configured to allocate resources to transmit and/or receive radio communication signals to/from at least the first source device 2111 and the second source device 2112 over the first P2P connection and the second P2P connection respectively. In various examples, the communication device 2100 may also communicate with AP 2130 by allocating respective resources. Accordingly, the communication device 2100 may be configured to transmit and/or receive radio communication signals over a WLAN connection that is established with the AP 2130 and P2P connections established with the source devices 2111, 2112, in a coexisting manner, in particular as exemplified with respect to FIGS. 22 and 23.

FIG. 22 shows an exemplary illustration with respect to a communication system. A communication device (e.g. the communication device 1100, the communication device 1700) may include a processor (e.g. the processor 1101, the processor 1701) and a communication module implementing various functions provided in this disclosure. The disclosure provided with respect to FIGS. 22 and 23 can be used in accordance with various aspects of this disclosure, in particular with the disclosures with respect to FIGS. 11-16 to communicate with one or more offload devices, and with respect to FIGS. 17-21 to communicate with one or more source devices and a sink device, with a coexisting WLAN connection with an AP.

The communication device 2200 may have a WLAN connection established with an AP 2210, and may have one or more P2P connections established with other communication devices 2220. The processor may allocate time and frequency resources for the communications to be performed over multiple connections. The processor may implement time and frequency allocation as one or more functions of a protocol stack. Particularly, the processor may perform communication operations over the multiple connections using data packets (e.g. by encoding data packets including application data, encoding data packets including mirroring content), and the time and frequency allocation may be provided as a MAC layer function, processing data packets including respective data (e.g. data including application data, or mirroring content) to be transmitted and/or received. In various examples, the processor (e.g. a controller of the processor) may exchange information with one or more MAC layers of respective protocol stacks of protocols governing the connections to manage the schedule of data packets of the respective protocols.

Within the existing implementation of WLAN technology, MAC layer have various functions, such as IBSS MAC layer functions configured to perform MAC layer functions for an independent basic service set (IBSS) (i.e. ad-hoc connection), BSS MAC layer functions configured to perform MAC layer functions for a BSS (i.e. WLAN network connection), GO MAC layer functions configured to perform MAC layer functions of a group owner, P2P MAC layer functions configured to perform MAC layer functions of a P2P protocol (Wi-Fi Direct), and auxiliary MAC layer functions configured to perform other MAC layer functions such as scanning, etc. In various examples, the processor may implement coexisting allocation and scheduling, in particular with BSS operations with further MAC layer functions. In other words, the disclosure provided with respect to FIGS. 22 and 23 may be performed by various functions implemented at the MAC layer.

The processor may allocate time resources for each connection to receive radio communication signals from the respective connection, or transmit radio communication signals towards the respective connection. Within each allocated time resource for a respective connection, the communication module is configured to receive and/or transmit radio communication signals of the respective connection. Accordingly, the communication device may receive and/or transmit radio communication signals via multiple connections by using time multiplexing.

The processor may allocate time resources for a connection governed by a communication protocol, and the protocol stack of the respective communication protocol may perform any operations within the allocated time resource. Exemplarily, a transmission over the WLAN connection with the AP 2210 may be configured to be transmitted using a carrier sense multiple access/collision avoidance (CSMA/CA) procedure. Accordingly, within the allocated time, the processor may control the communication module to listen the channel with respect to the connection and use the CSMA/CA to perform the scheduled transmission.

The processor may schedule data packets to be used to communicate with the AP 2210 and the P2P connected devices 2220 in a selective manner according to the allocated time resources based on the established connection. Furthermore, the processor may control the communication module to receive and/or transmit radio communication signals via the respective connections by adjusting various communication parameters (e.g. Tx power, AGC settings, frequency band, etc. assigned for the respective connection) according to the allocated resources for each connection.

The processor may be configured to allocate a time resource for a connection by taking into consideration at least one of whether the communication device is in active and/or passive scanning mode for one of the connections, a configuration information received from the operating system, which the configuration information may provide an indication with respect to a priority level, or an urgency with respect to the connections, a presence of a GO or whether the communication device is the GO or a GC in the connection, etc. Furthermore, the processor may further allocate time resources according to data rate and/or bandwidth of the connection or other connections, the amount of data within a buffer of the respective connection or other connections, or a control information received from the AP 2210.

Furthermore, the processor may encode/decode scheduling information to be exchanged with the P2P connected devices 2220 and the AP 2210. Exemplarily, the processor may encode information indicating allocated time resources for communication with the P2P connected devices 2220 for a transmission to the AP 2210, so that the AP 2210 would not schedule a transmission to the communication device 2200. Furthermore, the processor may further encode information indicating allocated time resources for one of the P2P connected devices 2220, possibly indicating the time resources in which the respective P2P connected device 2220 is scheduled to transmit and/or receive, so that the respective P2P connected device 2220 may schedule the communication with the communication device 2200 accordingly. It may be desirable to provide a coordination in such communication system to avoid packet losses.

The processor may schedule transmission of data packets with respect to a connection within its allocated time resources based on an identifier within the data packets. Exemplarily, the data packets may include MAC frames, and a MAC frame to be transmitted to the AP 2210 may include a frame type indicating that the MAC frame is of a BSS type. In various examples, the processor may encode data packets to be transmitted to the P2P connected devices 2220 with MAC frames including another frame type. Accordingly, the processor may schedule transmission of the data packets including MAC frames indicating a BSS MAC frame for a transmission to the AP 2210. The processor may further schedule transmission of the data packets including MAC frames indicating a P2P MAC frame for a transmission to the P2P connected devices 2220.

FIG. 23 shows an exemplary allocation of time slots to communicate via multiple connections in a communication system, in particular in the communication system provided in FIG. 22. Referring collectively with FIG. 22, the processor of the communication device 2200 may allocate time resources to transmit and/or receive radio communication signals over multiple connections using time slots, which may be equal-length time slots. Exemplarily, each time slot may represent 50 ms, but this may be further configured by the processor at a desired level. In various examples, a gap may be introduced between each time slot. The time slots may be sequential, and the gap between each time slot and/or the duration of time slots can be increased and/or decreased in a predefined sequence, or randomly.

The figure illustrates 16 time slots (corresponding 0.8 seconds with an exemplary time slot of 50 ms) allocated within a period of time 2300. As illustrated, the processor allocates various time slots to communicate over a connection established with the AP 2220, and various time slots to communicate with the P2P connected devices 2220 over their respective connections. As indicated, the processor may allocate each time slot for a respective connection, and the processor may control the communication module to receive and/or transmit radio communication signals to the respective device (AP 2220 or one of the P2P connected devices 2220) within the allocated time slot. The allocation of time slots may be arbitrarily, or may be made as provided exemplarily within this disclosure. Accordingly, the communication device 2200 may maintain communication with the AP 2220 (e.g. communication devices within the WLAN network or WAN network reachable over the AP 2220) and the P2P connected devices 2220 in a coexisting manner.

The processor may allocate a set of time slots for each device that is connected to the communication device 2200. For example, the processor may allocate a first set of time slots to transmit and/or receive radio communication signals to/from one of the devices (AP 2220 or one of the P2P connected devices 2220), and the processor may allocate a second set of time slots to transmit and/or receive radio communication signals to/from another one of the devices AP 2220 or another one of the P2P connected devices 2220). The number of the slots within each set may or may not be equal. In various examples, the processor may determine the number of the slots based on number of data packets scheduled for transmission, amount of data to be transmitted, etc.

Illustratively, starting from the left hand side, the processor may have allocated two time slots to communicate with the AP 2220, in which the communication module of the communication device 2200 may receive and/or transmit radio communication signals to the AP 2220. The processor may encode data packets to be transmitted to the AP 2220 at these two time slots prior to the transmission, and the encoded data packets may be stored in a memory (e.g. a buffer memory). Accordingly, the processor may control the communication module to transmit radio communication signals including the encoded data packets stored in the memory within these time slots. Analogous to this operation, the processor may have allocated the next slot for a reception from a first P2P connected device of the P2P connected devices 2220. The processor may control the communication module to receive radio communication signals from the first P2P connected device in the respective time slot which the received radio communication signals include data packets transmitted by the first connected P2P device.

Furthermore, the illustration with respect to the period of time 2300 exemplifies time slots allocated for a second P2P connected device of the P2P connected devices 2220 and a third P2P connected device of the P2P connected devices 2220. The processor may control the communication module to receive and/or transmit radio communication signals via the respective P2P connections established with these devices within their allocated time slots.

Figure 24:
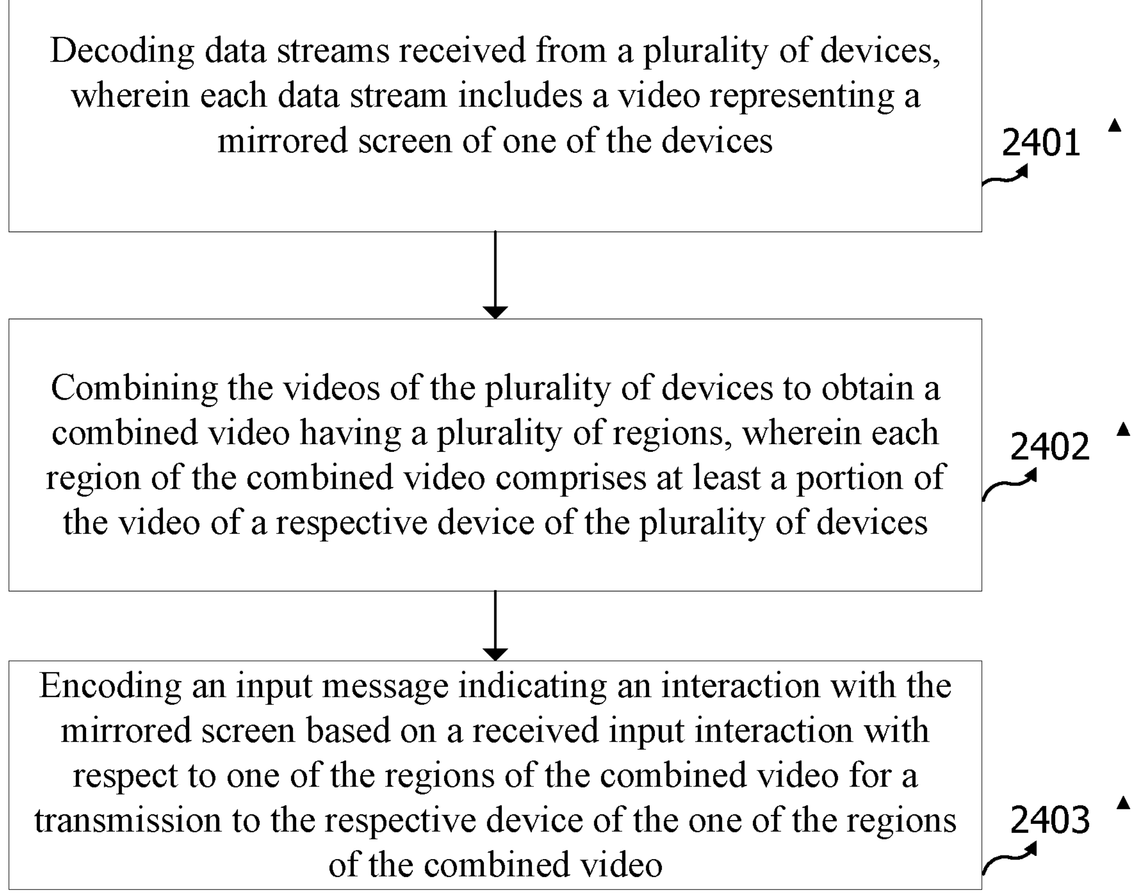
FIG. 24 shows an example of a method.

FIG. 24 shows an example of a method. The method may include decoding 2401 data streams received from a plurality of devices, wherein each data stream includes a video representing a mirrored screen of one of the devices, combining 2402 the videos of the plurality of devices to obtain a combined video having a plurality of regions, wherein each region of the combined video comprises at least a portion of the video of a respective device of the plurality of devices, and encoding 2403 an input message indicating an interaction with the mirrored screen based on a received input interaction with respect to one of the regions of the combined video for a transmission to the respective device of the one of the regions of the combined video.

The following examples pertain to further aspects of this disclosure.

In example 1A, the subject matter includes a communication device including: a processor configured to: establish a connection with one or more peripheral devices in response to a disconnection from an external communication device; determine that the external communication device is connectable based on radio communication signals received from the external communication device; encode a message to be transmitted to the one or more peripheral devices in response to the determination that the external communication device is connectable, can optionally include that the message is configured to cause the one or more peripheral devices to perform a high duty cycle advertising in accordance with a Bluetooth communication protocol.

In example 2A, the subject matter of example 1A, can optionally include that the processor is further configured to configure the one or more peripheral devices to perform communication operations in a low power mode for the established connection; can optionally include that the low power mode optionally includes performing communication events according to a low duty cycle that is lower than the duty cycle of the high duty cycle advertisements. In example 3A, the subject matter of example 1A or example 2A, can optionally include that the processor is configured to establish the connection with the one or more peripheral devices when a first established connection that is established between the communication device and the external communication device is disconnected. In example 4A, the subject matter of any one of examples 1A to 3A, can optionally include that the processor is further configured to determine that the external communication device is connectable based on at least one of a received advertisement packet, a received Bluetooth Low Energy, BLE, beacon, and/or received BLE signals from the external communication device(s). In example 5A, the subject matter of any one of examples 1A to 4A, can optionally include that the processor is further configured to determine that the external communication device is connectable based on an estimated proximity to the external communication device.

In example 6A, the subject matter of example 5A, can optionally include that processor is further configured to estimate the proximity to the first communication device based on one or more reference signal strength indicators (RSSIs). In example 7A, the subject matter of any one of examples 1A to 6A, can optionally include that the processor is further configured to decode a configuration message received from the external communication device(s), can optionally include that the configuration message includes information indicating the one or more peripheral devices. In example 8A, the subject matter of any one of examples 1A to 7A, can optionally include that the processor is further configured to configure the one or more peripheral devices using Generic Attribute Profile (GATT) transactions of the Bluetooth Low Energy communication protocol. In example 9A, the subject matter of any one of examples 1A to 8A, can optionally include that the message includes an indication that the external communication device(s) is/are connectable. In example 10A, the subject matter of any one of examples 1A to 9A, can optionally include that the message includes an identifier of the external communication device(s).

In example 11A, the subject matter of any one of examples 1A to 10A, can optionally include that the message includes an indication of an interval to be used for the high duty cycle advertising (to be used by the peripherals). In example 12A, the subject matter of any one of examples 1A to 11A, can optionally include that the processor is further configured to cease the established connection with the one or more peripheral devices in response to a transmission of the encoded message. In example 13A, the subject matter of any one of examples 1A to 11A, can optionally include that the processor is further configured to cease the established connection with the one or more peripheral devices in response to a decoded message received from the one or more peripheral devices indicating that the message is received. In example 14A, the subject matter of any one of examples 1A to 13A, can optionally include that the established connection with the one or more peripheral devices includes a service level connection; can optionally include that the service level connection is optionally a connection in which a radio frequency communication protocol (RFCOMM) over a logical link control and adaptation layer (L2CAP) connection is involved.

In example 15A, the subject matter of any one of examples 1A to 14A, may further include a memory configured to store information indicating the one or more peripheral devices, optionally the memory may store information indicating peripheral devices that are connected to each external communication device of a plurality of communication devices. In example 16A, the subject matter of any one of examples 1A to 15A, can optionally include that the memory is configured to store primary device information indicating one or more primary communication devices and secondary device information indicating one or more secondary communication devices; can optionally include that the processor is further configured to establish a connection with the one or more primary communication devices, in which the communication device is configured to operate as a secondary device; can optionally include that the processor is further configured to establish a connection with the one or more secondary devices, in which the communication device is configured to operate as a primary device. In example 17A, the subject matter of example 16A, can optionally include that the primary device information includes an identifier of the external communication device; can optionally include that the secondary device information includes identifiers of the one or more peripheral devices.

In example 18A, the subject matter of any one of examples 1A to 17A, may further include a transceiver configured to transmit and/or receive radio communication signals; may further include a measurement circuit configured to measure signal strength of received radio communication signals. In example 19A, the subject matter of any one of examples 1A to 18A, may further include a data acquisition unit configured to detect the proximity of the first communication device. In example 20A, the subject matter of any one of examples 1A to 19A, can optionally include that the communication device is a BLE communication device. In example 21A, the subject matter of any one of examples 1A to 20A, can optionally include that the processor is further configured to maintain connections with a plurality of external communication devices including the external communication device; can optionally include that the processor is further configured to decode configuration information received from each external communication device, the configuration information may include information indicating peripheral devices that are connected to the respective external communication device.

In example 22A, the subject matter of example 21A, can optionally include that the processor is further configured to determine connectable external communication devices from the plurality of external communication devices; can optionally include that the processor is further configured to encode messages for peripheral devices that were connected to the connectable external communication devices, to cause the peripheral devices to establish connections with the connectable external communication devices. In example 23A, A docking station may include the communication device according to any one of examples 1A to 22A.

In example 24A, the subject matter includes a communication device that may include: a processor configured to: decode a message received over an established connection from the first communication device, can optionally include that the decoded message indicates to perform a high duty cycle advertising to connect to a second communication device; schedule a plurality of advertisement packets to be transmitted in accordance with a Bluetooth communication protocol in response to the decoded message, can optionally include that each advertisement packet is scheduled for a transmission after a previously scheduled advertisement packet with an interval that is set according to a high duty cycle advertising mode.

In example 25A, the subject matter of example 24A, can optionally include that the plurality of advertisement packets include an identifier for the second communication device. In example 26A, the subject matter of example 24A or example 25A, can optionally include that the decoded message includes a second communication device identifier; can optionally include that each advertisement packet includes the second communication device identifier. In example 27A, the subject matter of any one of examples 24A to 26A, can optionally include that the processor is further configured to receive the message from the first communication device over Generic Attribute Profile (GATT) transactions; can optionally include that the processor is further configured to configure the communication operations to connect to the second communication device based on the decoded message. In example 28A, the subject matter of any one of examples 24A to 27A, can optionally include that the decoded message includes an interval indication; can optionally include that the processor is further configured to set the interval based on the interval indication. In example 29A, the subject matter of any one of examples 24A to 28A, can optionally include that the processor is further configured to set the interval based on a stored interval information for the high duty cycle advertising mode.

In example 30A, the subject matter of any one of examples 24A to 29A, can optionally include that the decoded message includes a GATT message; can optionally include that the processor is further configured to configure Generic Access Profile (GAP) to perform high duty cycle advertising to connect to the second communication device based on the GATT message. In example 31A, the subject matter of example 30A, can optionally include that the processor is further configured to encode one or more advertisement packets based on the configured GAP. In example 32A, the subject matter of any one of examples 24A to 31A, can optionally include that the processor is further configured to cease the established connection with the first communication device in response to the decoded message. In example 33A, the subject matter of any one of examples 24A to 32A, can optionally include that the interval is less than or equal to 7.5 ms or optionally less than or equal to 3.75 ms. In example 34A, the subject matter of any one of examples 24A to 33A, can optionally include that the one or more advertisement packets include a BLE data frame to be broadcasted.

In example 35A, the subject matter includes a method that may include: establishing a connection with one or more peripheral devices in response to a disconnection from an external communication device; determining that the external communication device is connectable based on radio communication signals received from the external communication device; encoding a message to be transmitted to the one or more peripheral devices in response to the determination that the external communication device is connectable, can optionally include that the message is configured to cause the one or more peripheral devices to perform a high duty cycle advertising in accordance with a Bluetooth communication protocol.

In example 36A, the subject matter of example 35A, may further include: configuring the one or more peripheral devices to perform communication operations in a low power mode for the established connection; can optionally include that the low power mode optionally includes performing communication events according to a low duty cycle that is lower than the duty cycle of the high duty cycle advertisements. In example 37A, the subject matter of example 35A or example 36A, may further include: establishing the connection with the one or more peripheral devices when a first established connection that is established between the communication device and the external communication device is disconnected. In example 38A, the subject matter of any one of examples 35A to 37A, may further include: determining that the external communication device is connectable based on at least one of a received advertisement packet, a received Bluetooth Low Energy, BLE, beacon, and/or received BLE signals from the external communication device(s). In example 39A, the subject matter of any one of examples 35A to 38A, may further include: determining that the external communication device is connectable based on an estimated proximity to the external communication device.

In example 40A, the subject matter of example 39A, may further include: estimating the proximity to the first communication device based on one or more reference signal strength indicators (RSSIs). In example 41A, the subject matter of any one of examples 35A to 40A, may further include: decoding a configuration message received from the external communication device(s), can optionally include that the configuration message includes information indicating the one or more peripheral devices. In example 42A, the subject matter of any one of examples 35A to 41A, may further include: configuring the one or more peripheral devices using Generic Attribute Profile (GATT) transactions of the Bluetooth Low Energy communication protocol. In example 43A, the subject matter of any one of examples 35A to 42A, can optionally include that the message includes an indication that the external communication device(s) is/are connectable. In example 44A, the subject matter of any one of examples 35A to 43A, can optionally include that the message includes an identifier of the external communication device(s).

In example 45A, the subject matter of any one of examples 35A to 44A, can optionally include that the message includes an indication of an interval to be used for the high duty cycle advertising (to be used by the peripherals). In example 46A, the subject matter of any one of examples 35A to 45A, may further include: ceasing the established connection with the one or more peripheral devices in response to a transmission of the encoded message. In example 47A, the subject matter of any one of examples 35A to 45A, may further include: ceasing the established connection with the one or more peripheral devices in response to a decoded message received from the one or more peripheral devices indicating that the message is received. In example 48A, the subject matter of any one of examples 35A to 47A, can optionally include that the established connection with the one or more peripheral devices includes a service level connection; can optionally include that the service level connection is optionally a connection in which a radio frequency communication protocol (RFCOMM) over a logical link control and adaptation layer (L2CAP) connection is involved. In example 49A, the subject matter of any one of examples 35A to 48A, may further include: storing information indicating the one or more peripheral devices to a memory.

In example 50A, the subject matter of any one of examples 35A to 49 may further include: storing primary device information indicating one or more primary communication devices and secondary device information indicating one or more secondary communication devices; establishing a connection with the one or more primary communication devices, in which the communication device is configured to operate as a secondary device; establishing a connection with the one or more secondary devices, in which the communication device is configured to operate as a primary device. In example 51A, the subject matter of example 50A, can optionally include that the primary device information includes an identifier of the external communication device; can optionally include that the secondary device information includes identifiers of the one or more peripheral devices.

In example 52A, the subject matter of any one of examples 35A to 51A, may further include: transmitting and/or receiving radio communication signals by a transceiver; measuring signal strength of received radio communication signals. In example 53A, the subject matter of any one of examples 35A to 52A, may further include: detecting the proximity of the first communication device. In example 54A, the subject matter of any one of examples 35A to 53A, can optionally include that the method is performed by a BLE communication device. In example 55A, the subject matter of any one of examples 35A to 54A, may further include: maintaining connections with a plurality of external communication devices including the external communication device; decoding configuration information received from each external communication device, the configuration information may include information indicating peripheral devices that are connected to the respective external communication device. In example 56A, the subject matter of example 55A, may further include: determining connectable external communication devices from the plurality of external communication devices; encoding messages for peripheral devices that were connected to the connectable external communication devices, to cause the peripheral devices to establish connections with the connectable external communication devices. In example 57A, the subject matter of any one of examples 35A to 56A, can optionally include that the method is performed by a docking station.

In example 58A, the subject matter includes a method that may include: decoding a message received over an established connection from the first communication device, can optionally include that the decoded message indicates to perform a high duty cycle advertising to connect to a second communication device; scheduling a plurality of advertisement packets to be transmitted in accordance with a Bluetooth communication protocol in response to the decoded message, can optionally include that each advertisement packet is scheduled for a transmission after a previously scheduled advertisement packet with an interval that is set according to a high duty cycle advertising mode.

In example 59A, the subject matter of example 58A, can optionally include that the plurality of advertisement packets include an identifier for the second communication device. In example 60A, the subject matter of example 58A or example 59A, can optionally include that the decoded message includes a second communication device identifier; can optionally include that each advertisement packet includes the second communication device identifier. In example 61A, the subject matter of any one of examples 58A to 60A, may further include: receiving the message from the first communication device over Generic Attribute Profile (GATT) transactions; configuring the communication operations to connect to the second communication device based on the decoded message. In example 62A, the subject matter of any one of examples 58A to 61A, can optionally include that the decoded message includes an interval indication; can optionally include that the method further includes setting the interval based on the interval indication.

In example 63A, the subject matter of any one of examples 58A to 62A, may further include: setting the interval based on a stored interval information for the high duty cycle advertising mode. In example 64A, the subject matter of any one of examples 58A to 63A, can optionally include that the decoded message includes a GATT message; can optionally include that the method further includes configuring Generic Access Profile (GAP) to perform high duty cycle advertising to connect to the second communication device based on the GATT message. In example 65A, the subject matter of example 64A, may further include: encoding one or more advertisement packets based on the configured GAP. In example 66A, the subject matter of any one of examples 58A to 65A, may further include: ceasing the established connection with the first communication device in response to the decoded message. In example 67A, the subject matter of any one of examples 58A to 66A, can optionally include that the interval is less than or equal to 7.5 ms or optionally less than or equal to 3.75 ms. In example 68A, the subject matter of any one of examples 58A to 67A, can optionally include that the one or more advertisement packets include a BLE data frame to be broadcasted. In example 69A, the subject matter includes a non-transitory computer-readable medium that may include one or more instructions which, if executed by a processor, cause the processor to perform a method according to any one of the examples 35A to 68A.

In example 1B, the subject matter includes a communication device including: a processor configured to: execute a plurality of applications, each application is configured to cause the communication device to exchange data with a further communication device; determine, for one of the applications, an external communication device based on device information indicating communication capabilities of the external communication device; offload communication activities for the one of the applications to the external communication device over an established connection through which the data exchanged with respect to the one of the applications between the communication device and the respective further communication device is exchanged with the external communication device.

In example 2B, the subject matter of example 1B, can optionally include that the communication device is a WLAN communication device; can optionally include that the established connection with the external communication device is a first connection; can optionally include that the processor is configured to communicate with an access point (AP) over a second connection to exchange data with respect to at least one other application of the plurality of applications. In example 3B, the subject matter of example 2B, can optionally include that the first connection includes a point-to-point (P2P) connection; can optionally include that the processor is responsive to the determination of the external communication device to establish the P2P connection with the external communication device. In example 4B, the subject matter of example 2B or example 3B, may further include a transceiver configured to communicate with the external communication device over the first connection and communicate with the AP over the second connection. In example 5B, the subject matter of any one of examples 2B to 4B, can optionally include that the transceiver includes a first circuit configured to receive and/or transmit communication signals according to a first communication protocol, and a second circuit configured to receive and/or transmit communication signals according to a second communication protocol.

In example 6B, the subject matter of any one of examples 2B to 5B, can optionally include that the first communication protocol is at least one of a wired communication protocol, such as a Universal Serial Bus (USB) protocol, a WLAN point-to-point protocol, or a cellular communication protocol. In example 7B, the subject matter of any one of examples 2B to 6B, can optionally include that the first connection is governed by a first communication protocol and the second connection is governed by a second communication protocol; can optionally include that the processor is further configured to selectively encode and/or decode the data according to the first communication protocol and the second communication protocol. In example 8B, the subject matter of any one of examples 2B to 7B, can optionally include that the processor is further configured to determine one or more external communication devices may include the external communication device for the plurality of applications; can optionally include that the processor is further configured to offload communication activities for the plurality of applications to the one or more external communication devices. In example 9B, the subject matter of any one of examples 2B to 8B, can optionally include that the processor is further configured to configure resources to communicate with the one or more external communication devices and the AP.

In example 10B, the subject matter of any one of examples 1B to 9B, can optionally include that the processor is further configured to encode and/or decode offload communication data may include the data of the applications to be offloaded to the one or more external communication devices; can optionally include that the processor is further configured to encode and/or decode direct communication data may include the data of the applications that are not to be offloaded to the one or more external communication devices. In example 11B, the subject matter of example 10B, can optionally include that the processor is further configured to schedule transmission and/or reception of the direct communication data and the offload communication data by using time multiplexing. In example 12B, the subject matter of example 10B or example 11B, can optionally include that the processor is further configured to allocate time resources to transmit and/or receive the data using time slots, in which the communication device transmits and/or receive data in each time slot; can optionally include that a gap is provided between two consecutive time slots; and can optionally include that the duration of the time slots and/or the gap is adjustable; and can optionally include that the processor is further configured to allocate a first set of time slots to transmit and/or receive the direct communication data and a second set of time slots to transmit and/or receive the offload communication data. In example 13B, the subject matter of example 12B, can optionally include that the second set of time slots includes a plurality of time slots, in which the communication device transmits or receives radio communication signals to one of the one or more external communication devices at each time slot.

In example 14B, the subject matter of any one of examples 12B to 13B, can optionally include that the processor is further configured to control a transceiver circuit to transmit and/or receive the direct communication data at the first set of time slots and transmit and/or receive the offload communication data at the second set of time slots. In example 15B, the subject matter of any one of examples 1B to 14B, can optionally include that the processor is further configured to encode control information indicating the offload of the communication activities for a transmission to the external communication device. In example 16B, the subject matter of example 15B, can optionally include that the control information includes an identifier indicating the data exchanged with respect to the one of the applications; can optionally include that the processor is further configured to encode and/or decode data packets based on the identifier provided with the data. In example 17B, the subject matter of any one of examples 15B to 16B, can optionally include that the processor is further configured to control the offloaded communication activities of the external communication device; can optionally include that the processor is further configured to control the offloaded communication activities based on the device information. In example 18B, the subject matter of any one of examples 15B to 17B, can optionally include that the control information includes configuration information indicating a communication configuration to be used by the external communication device to exchange the data with the respective further communication device.

In example 19B, the subject matter of example 18B, can optionally include that the configuration information includes an indication of at least one of a communication technology, a communication protocol, or a communication mode, and can optionally include that the communication protocol may be any one of a local area network (LAN) communication protocol, a wireless local area network (WLAN) communication protocol, a Bluetooth communication protocol, a cellular communication protocol, or a satellite communication protocol. In example 20B, the subject matter of any one of examples 1B to 19B, can optionally include that the processor is further configured to reconfigure the communication configuration used by the external communication device based on at least one of the applications. In example 21B, the subject matter of any one of examples 1B to 20B, can optionally include that the established connection with the external communication device is a secure connection. In example 22B, the subject matter of any one of examples 1B to 21B, can optionally include that the processor is further configured to exchange the data with the respective further communication devices for the plurality of applications over established sessions. In example 23B, the subject matter of any one of examples 1B to 22B, can optionally include that the processor is further configured to select the one application from the plurality of applications based on the device information.

In example 24B, the subject matter of any one of examples 1B to 23B, can optionally include that the processor is further configured to determine the at least one application based on application information indicating attributes of each of the application; can optionally include that the attributes include at least one of a priority indicating a priority among the plurality of applications, predefined data traffic indicating a predefined amount of data to be exchanged or amount of data predicted to be exchanged for a predefined period of time. In example 25B, the subject matter of any one of examples 1B to 24B, can optionally include that the communication device is configured to receive and/or transmit communication signals may include the data with respect to the at least one application according to the second communication protocol to communicate with the external communication device. In example 26B, the subject matter of any one of examples 1B to 25B, a memory configured to store device information may include external communication devices that are couplable to the communication device and the capability information indicating communication capabilities of the external communication devices.

In example 27B, the subject matter may include a communication system that may include: a first communication device may include the communication device according to any one of examples 1B to 26B; a second communication device as the external communication device, can optionally include that the second communication device includes a second communication device processor configured to decode received control information from the first communication device and transmit and/or receive the data with respect to the one of the applications over a communication configured according the control information. In example 28B, the subject matter of example 27B, can optionally include that the second communication device processor is further configured to decode first communication protocol data received from the first communication device and encode second communication protocol data may include at least a portion of the decoded first communication protocol data to be transmitted to the respective further communication device. In example 29B, the subject matter of example 28B, can optionally include that the second communication device processor is configured to decode second communication protocol data received from the respective further communication device and encode first communication protocol data may include at least a portion of the decoded second communication protocol data to be transmitted to the first communication device.

In example 30B, the subject matter of example 29B, can optionally include that the second communication device processor is configured to allocate resources to communicate with the first communication device and the respective further communication device using time multiplexing. In example 31B, the subject matter of any one of examples 27B to 30B, may further include: an access point communicatively coupled to the first communication device and the second communication device to provide network access for the first communication device and the second communication device; can optionally include that the first communication device communicates with the second communication device over an established point-to-point connection with the second communication device to exchange the data of the at least one of the applications; can optionally include that processor of the first communication device is configured to schedule resources to communicate with the access point and the second communication device using time multiplexing. In example 32B, the subject matter of example 31B, can optionally include that second communication device processor is further configured to schedule resources to communicate with the access point and the first communication device using time multiplexing.

In example 33B, the subject matter includes a method that may include: executing a plurality of applications, each application is configured to cause the communication device to exchange data with a further communication device; determining, for one of the applications, an external communication device based on device information indicating communication capabilities of the external communication device; offloading communication activities for the one of the applications to the external communication device over an established connection through which the data exchanged with respect to the one of the applications between the communication device and the respective further communication device is exchanged with the external communication device.

In example 34B, the subject matter of example 33B, can optionally include that the method is performed by a WLAN communication device; can optionally include that the established connection with the external communication device is a first connection; can optionally include that the method further includes to communicate with an access point (AP) over a second connection to exchange data with respect to at least one other application of the plurality of applications. In example 35B, the subject matter of example 34B, can optionally include that the first connection includes a point-to-point (P2P) connection; establishing the P2P connection with the external communication device responsive to the determination of the external communication device. In example 36B, the subject matter of example 33B or example 34B, may further include: communicating, by a transceiver, with the external communication device over the first connection and communicate with the AP over the second connection.

In example 37B, the subject matter of any one of examples 34B to 36B, receiving and/or transmitting, by a first circuit, communication signals according to a first communication protocol; and receiving and/or transmitting, by a second circuit, communication signals according to a second communication protocol. In example 38B, the subject matter of any one of examples 34B to 37B, can optionally include that the first communication protocol is at least one of a wired communication protocol, such as a Universal Serial Bus (USB) protocol, a WLAN point-to-point protocol, or a cellular communication protocol. In example 39B, the subject matter of any one of examples 34B to 38B, can optionally include that the first connection is governed by a first communication protocol and the second connection is governed by a second communication protocol; can optionally include that the method further includes selectively encoding and/or decoding the data according to the first communication protocol and the second communication protocol. In example 40B, the subject matter of any one of examples 34B to 39B, may further include: determining one or more external communication devices may include the external communication device for the plurality of applications; offloading communication activities for the plurality of applications to the one or more external communication devices.

In example 41B, the subject matter of any one of examples 34B to 40B, may further include: configuring resources to communicate with the one or more external communication devices and the AP. In example 42B, the subject matter of any one of examples 33B to 41B, may further include: encoding and/or decoding offload communication data may include the data of the applications to be offloaded to the one or more external communication devices; encoding and/or decoding direct communication data may include the data of the applications that are not to be offloaded to the one or more external communication devices. In example 43B, the subject matter of example 42B, may further include: scheduling transmission and/or reception of the direct communication data and the offload communication data by using time multiplexing. In example 44B, the subject matter of example 42B or example 43B, may further include: allocating time resources to transmit and/or receive the data using time slots, in which the communication device transmits and/or receive data in each time slot; optionally providing a gap is between two consecutive time slots; and optionally adjusting the duration of the time slots and/or the gap between two consecutive time slots; allocating a first set of time slots to transmit and/or receive the direct communication data and a second set of time slots to transmit and/or receive the offload communication data.

In example 45B, the subject matter of example 44B, can optionally include that the second set of time slots includes a plurality of time slots, in which the communication device transmits or receives radio communication signals to one of the one or more external communication devices at each time slot. In example 46B, the subject matter of any one of examples 44B to 45B, may further include: controlling a transceiver circuit to transmit and/or receive the direct communication data at the first set of time slots and transmit and/or receive the offload communication data at the second set of time slots. In example 47B, the subject matter of any one of examples 33B to 46B, may further include: encoding control information indicating the offload of the communication activities for a transmission to the external communication device. In example 48B, the subject matter of example 47B, can optionally include that the control information includes an identifier indicating the data exchanged with respect to the one of the applications; can optionally include that the method further includes encoding and/or decoding data packets based on the identifier provided with the data.

In example 49B, the subject matter of any one of examples 48B to 49B, may further include: controlling the offloaded communication activities of the external communication device; and controlling the offloaded communication activities based on the device information. In example 50B, the subject matter of any one of examples 48B to 49B, can optionally include that the control information includes configuration information indicating a communication configuration to be used by the external communication device to exchange the data with the respective further communication device. In example 51B, the subject matter of example 50B, can optionally include that the configuration information includes an indication of at least one of a communication technology, a communication protocol, or a communication mode, and can optionally include that the communication protocol may be any one of a local area network (LAN) communication protocol, a wireless local area network (WLAN) communication protocol, a Bluetooth communication protocol, a cellular communication protocol, or a satellite communication protocol. In example 52B, the subject matter of any one of examples 33B to 51B, may further include: reconfiguring the communication configuration used by the external communication device based on at least one of the applications. In example 53B, the subject matter of any one of examples 33B to 52B, can optionally include that the established connection with the external communication device is a secure connection. In example 54B, the subject matter of any one of examples 33B to 53B, may further include: exchanging the data with the respective further communication devices for the plurality of applications over established sessions.

In example 55B, the subject matter of any one of examples 33B to 54B, may further include: selecting the one application from the plurality of applications based on the device information. In example 56B, the subject matter of any one of examples 33B to 55B, may further include: determining the at least one application based on application information indicating attributes of each of the application; can optionally include that the attributes include at least one of a priority indicating a priority among the plurality of applications, predefined data traffic indicating a predefined amount of data to be exchanged or amount of data predicted to be exchanged for a predefined period of time. In example 57B, the subject matter of any one of examples 33B to 56B, may further include: receiving and/or transmitting communication signals may include the data with respect to the at least one application according to the second communication protocol to communicate with the external communication device. In example 58B, the subject matter of any one of examples 33B to 57B, may further include: storing device information may include external communication devices that are couplable to the communication device and the capability information indicating communication capabilities of the external communication devices in a memory.

In example 59B, the subject matter of any one of examples 33B to 58B, may further include: decoding, at a second communication device, received control information from the first communication device and transmit and/or receive the data with respect to the one of the applications over a communication configured according the control information. In example 60B, the subject matter of example 59B, may further include: decoding, at the second communication device, first communication protocol data received from the first communication device and encoding second communication protocol data may include at least a portion of the decoded first communication protocol data to be transmitted to the respective further communication device. In example 61B, the subject matter of example 60B, may further include: decoding at the second communication device, second communication protocol data received and encoding first communication protocol data may include at least a portion of the decoded second communication protocol data to be transmitted.

In example 62B, the subject matter of example 61B, may further include: allocating, at the second communication device, resources to communicate with the first communication device and the respective further communication device using time multiplexing. In example 63B, the subject matter of any one of examples 59B to 62B, may further include: communicating, at the communication device with an access point; communicating with the second communication device over an established point-to-point connection to exchange the data of the at least one of the applications; the method further includes scheduling resources to communicate with the access point and the second communication device using time multiplexing.

In example 64B, the subject matter of example 63B, may further include: scheduling resources, at the second communication device, to communicate with the access point and the first communication device using time multiplexing. In example 64B, the subject matter includes a non-transitory computer-readable medium that may include one or more instructions which, if executed by a processor, cause the processor to perform any of the methods 33B to 64B, In example 1C, the subject matter includes a communication device including: a processor configured to: decode data streams received from a plurality of devices, each data stream includes a video representing a mirrored screen of one of the devices; combine the videos of the plurality of devices to obtain a combined video having a plurality of regions, wherein each region of the combined video includes at least a portion of the video of a respective device of the plurality of devices; encode an input message indicating an interaction with the mirrored screen based on a received input interaction with respect to one of the regions of the combined video for a transmission to the respective device of the one of the region.

In example 2C, the subject matter of example 1C, wherein the communication device is coupled to an input device to receive the input interaction; wherein the input device includes at least one of a mouse, a keyboard, a pointer, a touch screen, and/or a sensor. In example 3C, the subject matter of example 2C, wherein the input device includes an eye-tracking sensor configured to provide eye-tracking sensor data. In example 4C, the subject matter of example 3C, wherein the processor is further configured to determine a size of each of the regions based on the eye-tracking sensor data. In example 5C, the subject matter of example 3C or example 4C, wherein the processor is further configured to adjust the size of at least one of the regions based on the eye-tracking sensor data. In example 6C, the subject matter of any one of examples 3C to 5C, wherein the processor is further configured to adjust the size of at least the portion of the video within one of the regions based on the eye-tracking sensor data.

In example 7C, the subject matter of any one of examples 3C to 6C, wherein the processor is further configured to determine the adjusted size based on the eye-tracking sensor data. In example 8C, the subject matter of any one of examples 1C to 7C, wherein the processor is further configured to encode the combined video according to a screen mirroring protocol for a transmission to a sink device; wherein the processor is optionally configured to encode the combined video into display data for a transmission to a sink device over via a wired interface; wherein the wired interface optionally includes a Universal Serial Bus (USB) or a High Definition Multimedia Interface (HDMI). In example 9C, the subject matter of example 8C, wherein the processor is further configured to decode configuration information received from the sink device. In example 11C, the subject matter of example 9C, can optionally include that the configuration information includes an indication of at least one of a communication technology, a communication protocol, or a communication mode.

In example 11C, the subject matter of any one of examples 9C to 10C, can optionally include that the processor is further configured to configure the communication with the sink device based on the received configuration information. In example 12C, the subject matter of any one of examples 1C to 11C, further may include a display configured to display the combined video. In example 13C, the subject matter of any one of examples 1C to 12C, can optionally include that the processor is further configured to encode a communication device video representing the mirrored screen of the communication device; can optionally include that one of the regions of the combined video includes the communication device video. In example 14C, the subject matter of any one of examples 1C to 13C, can optionally include that the input message includes an indication of at least one of a key event, a pointer event, a touch event, a sink status event, a user interface blocking event, an audio blocking event, or a sink cut text event. In example 15C, the subject matter of any one of examples 1C to 14C, can optionally include that the processor is further configured to schedule reception of the data streams from the plurality of devices according to time multiplexing. In example 16C, the subject matter of any one of examples 1C to 15C, can optionally include that the processor is further configured to allocate time resources to receive the data streams using time slots, in which the communication device receive data from one of the devices in each time slot; can optionally include that the processor is further configured to allocate a first set of time slots to receive data from a first device of the devices and a second set of time slots to receive data from a second device of the devices.

In example 17C, the subject matter of example 16C, can optionally include that the processor is further configured to allocate a set of time slots to communicate with the plurality of devices. In example 18C, the subject matter of any one of examples 16C to 17C, can optionally include that the processor is further configured to allocate the time resources based on at least one of a scanning mode, a state of a group owner, and/or a state with respect to a connection between the communication device and an access point. In example 19C, the subject matter of any one of examples 1C to 18C, further may include a transceiver configured to communicate with the plurality of devices. In example 20C, the subject matter of example 19C, can optionally include that the communication device is a WLAN communication device; can optionally include that the transceiver is configured communicate with at least one of the devices over a first connection and communicate with an access point over a second connection simultaneously. In example 21C, the subject matter of any one of examples 19C to 20C, can optionally include that the transceiver is configured to communicate with the plurality of devices over a plurality point-to-point connections using the time multiplexing. In example 22C, the subject matter of any one of examples 19C to 21C, can optionally include that the processor is further configured to control a transceiver circuit to transmit and/or receive radio communication signals from one of the devices based on the allocation of the time resources.

In example 23C, the subject matter includes a system that may include: the communication device according to any one of examples 1C to 22C; a sink device may include: a sink device transceiver configured to communicate with the communication device to receive combined video; a sink device display configured to display the combined video; an input interface configured to receive an interaction with respect to one of the regions of the combined video; a sink device processor configured to encode an interaction message indicating the received instruction for a transmission to the communication device. In example 24C, the subject matter of example 24C, further may include: can optionally include that the sink device includes an eye-tracking sensor as the input device. In example 25C, the subject matter of example 23C or example 24C, can optionally include that the sink device transceiver is communicatively coupled to an access point to communicate with the communication device. In example 26C, the system of any one of examples 23C to 25C, can optionally include that the combined video is communicated to the sink device transceiver according to a screen mirroring protocol.

In example 27C, the subject matter includes a method that may include: decoding data streams received from a plurality of devices, each data stream includes a video representing a mirrored screen of one of the devices; combining the videos of the plurality of devices to obtain a combined video having a plurality of regions, can optionally include that each region of the combined video includes at least a portion of the video of a respective device of the plurality of devices; encoding an input message indicating an interaction with the mirrored screen based on a received input interaction with respect to one of the regions of the combined video for a transmission to the respective device of the one of the region.

In example 28C, the subject matter of example 27C, further may include: receiving the input interaction from an input device; can optionally include that the input device includes at least one of a mouse, a keyboard, a pointer, a touch screen, and/or a sensor. In example 29C, the subject matter of example 28C, can optionally include that the input device includes an eye-tracking sensor providing eye-tracking sensor data. In example 30C, the subject matter of example 29C, further may include: determining a size of each of the regions based on the eye-tracking sensor data. In example 31C, the subject matter of example 29C or example 30C, further may include: adjusting the size of at least one of the regions based on the eye-tracking sensor data. In example 32C, the subject matter of any one of examples 29C to 31C, further may include: adjusting the size of at least the portion of the video within one of the regions based on the eye-tracking sensor data. In example 33C, the subject matter of any one of examples 29C to 32C, further may include: determining the adjusted size based on the eye-tracking sensor data. In example 34C, the subject matter of any one of examples 27C to 33C, further may include: encoding the combined video according to a screen mirroring protocol for a transmission to a sink device; optionally encoding the combined video into display data for a transmission to a sink device over via an interface; can optionally include that the wired interface optionally includes a Universal Serial Bus (USB) or a High Definition Multimedia Interface (HDMI). In example 35C, the subject matter of example 34C, further may include: decoding configuration information received from the sink device.

In example 36C, the subject matter of example 35C, can optionally include that the configuration information includes an indication of at least one of a communication technology, a communication protocol, or a communication mode. In example 37C, the subject matter of any one of examples 35C to 36C, further may include: configuring the communication with the sink device based on the received configuration information. In example 38C, the subject matter of any one of examples 27C to 37C, further may include: displaying, by a display, the combined video. In example 39C, the subject matter of any one of examples 27C to 38C, further may include: encoding a communication device video representing the mirrored screen of the communication device; can optionally include that one of the regions of the combined video includes the communication device video. In example 40C, the subject matter of any one of examples 27C to 39C, can optionally include that the input message includes an indication of at least one of a key event, a pointer event, a touch event, a sink status event, a user interface blocking event, an audio blocking event, or a sink cut text event. In example 41C, the subject matter of any one of examples 27C to 40C, further may include: scheduling reception of the data streams from the plurality of devices according to time multiplexing.

In example 42C, the subject matter of any one of examples 27C to 41C, further may include: allocating time resources to receive the data streams using time slots, in which the communication device receive data from one of the devices in each time slot; allocating a first set of time slots to receive data from a first device of the devices and a second set of time slots to receive data from a second device of the devices. In example 43C, the subject matter of example 42C, further may include: allocating a set of time slots to communicate with the plurality of devices. In example 44C, the subject matter of any one of examples 42C to 43C, further may include: allocating the time resources based on at least one of a scanning mode, a state of a group owner, and/or a state with respect to a connection between the communication device and an access point. In example 45C, the subject matter of any one of examples 27C to 44C, further may include: transmitting and/or receiving radio communication signals, by a transceiver, to/from the plurality of devices. In example 46C, the subject matter of example 45C, can optionally include that the communication device is a WLAN communication device; can optionally include that the method further includes communicating with at least one of the devices over a first connection and communicating with an access point over a second connection simultaneously.

In example 47C, the subject matter of any one of examples 45C to 46C, further may include: communicating with the plurality of devices over a plurality point-to-point connections using the time multiplexing. In example 48C, the subject matter of any one of examples 45C to 47C, further may include: controlling a transceiver circuit to transmit and/or receive radio communication signals from one of the devices based on the allocation of the time resources. In example 49C, the subject matter of any one of examples 27C to 48 further may include: communicating with a sink device transceiver included by a sink device; receiving, by the sink device, the combined video; displaying, by a sink device display, the combined video; receiving, by an input interface, an interaction with respect to one of the regions of the combined video; encoding, by a sink device processor, an interaction message indicating the received instruction for a transmission to the communication device. In example 50C, the subject matter of example 49C, further may include: can optionally include that the sink device includes an eye-tracking sensor as the input device. In example 51C, the subject matter of example 49C or example 50C, communicating, by the sink device transceiver, with an access point.

In example 52C, the subject matter includes a non-transitory computer-readable medium that may include one or more instructions which, if executed by a processor, cause the processor to perform any one of the methods 27C to 51C, The word “exemplary” is used herein to mean “serving as an example, instance, or illustration”. Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication device comprising:

a memory;

a processor adaptable to:

establish a connection with one or more peripheral devices in response to a disconnection from an external communication device;

configure the one or more peripheral devices to perform communication events according to a low duty cycle for the established connection;

determine that the external communication device is connectable again based on radio communication signals received from the external communication device;

encode a message;

transmit the message to the one or more peripheral devices in response to the determination that the external communication device is connectable, wherein the message indicates a high duty cycle advertising mode and is adaptable to cause the one or more peripheral devices perform a high duty cycle advertising in accordance with a Bluetooth communication protocol to connect to the external communication device.

2. The communication device of claim 1, wherein the processor is further adaptable to configure the one or more peripheral devices to perform communication operations in a low power mode for the established connection;

wherein the low power mode comprises performing communication events according to the low duty cycle that is lower than the duty cycle of the high duty cycle advertisements.

3. The communication device of claim 1, wherein the processor is adaptable to establish the connection with the one or more peripheral devices when a first established connection that is established between the communication device and the external communication device is disconnected.

4. The communication device of claim 1, wherein the processor is further adaptable to determine that the external communication device is connectable based on at least one of a received advertisement packet, a received Bluetooth Low Energy, BLE, beacon, or received BLE signals from the external communication device.

5. The communication device of claim 1,
wherein the processor is further adaptable to determine that the external communication device is connectable based on an estimated proximity to the external communication device.

6. The communication device of claim 5,
wherein processor is further adaptable to estimate the proximity to the external communication device based on one or more reference signal strength indicators (RSSIs).

7. The communication device of claim 1,
wherein the processor is further adaptable to decode a configuration message received from the external communication device, wherein the configuration message comprises information representing the one or more peripheral devices.

8. The communication device of claim 1,
wherein the processor is further adaptable to configure the one or more peripheral devices using Generic Attribute Profile (GATT) transactions of the Bluetooth Low Energy communication protocol.

9. The communication device of claim 1,
wherein the memory is adaptable to store primary device information representing one or more primary communication devices and secondary device information representing one or more secondary communication devices;
wherein the processor is further adaptable to establish a connection with the one or more primary communication devices, in which the communication device is adaptable to operate as a secondary device;
wherein the processor is further adaptable to establish a connection with the one or more secondary devices, in which the communication device is adaptable to operate as a primary device.

10. The communication device of claim 1,
wherein the communication device is a BLE communication device.

11. The communication device of claim 1,
wherein the message comprises at least one of an indication that the external communication device is connectable, an identifier of the external communication device, or an indication of an interval to be used for the high duty cycle advertising.

12. The communication device of claim 1,
wherein the processor is further adaptable to determine that the external communication device is connectable based on an estimated proximity to the external communication device, wherein the estimated proximity is based on one or more reference signal strength indicators (RSSIs).

13. The communication device of claim 1,
wherein the processor is further adaptable to configure the one or more peripheral devices using Generic Attribute Profile (GATT) transactions of the Bluetooth Low Energy communication protocol.

14. The communication device of claim 1,
wherein the established connection with the one or more peripheral devices comprises a service level connection involving a radio frequency communication protocol (RFCOMM) over a logical link control and adaptation layer (L2CAP) connection.

15. The communication device of claim 1,
wherein the processor is further adaptable to maintain connections with a plurality of external communication devices including the external communication device, and determine connectable external communication devices from the plurality of external communication devices.

16. The communication device of claim 15,
wherein the processor is further adaptable to encode messages for peripheral devices that were connected to the connectable external communication devices to cause the peripheral devices to establish connections with the connectable external communication devices.

17. The communication device of claim 1,
wherein the communication device comprises a docking station.

18. The communication device of claim 1,
wherein the processor is further adaptable to cease the established connection with the one or more peripheral devices in response to the encoded message.

19. A non-transitory computer-readable medium comprising one or more instructions which, if executed by a processor, cause the processor to:
establish a connection with one or more peripheral devices in response to a disconnection from an external communication device;
configure the one or more peripheral devices to perform communication events according to a low duty cycle for the established connection;
determine that the external communication device is connectable again based on radio communication signals received from the external communication device;
encode a message;
transmit the message to the one or more peripheral devices in response to the determination that the external communication device is connectable, wherein the message indicates a high duty cycle advertising mode and is adaptable to cause the one or more peripheral devices to perform a high duty cycle advertising in accordance with a Bluetooth communication protocol to connect to the external communication device.

20. The non-transitory computer-readable medium of claim 19,
wherein the instructions further cause the processor to configure the one or more peripheral devices to perform communication operations in a low power mode for the established connection; wherein the low power mode comprises performing communication events according to the low duty cycle that is lower than the duty cycle of the high duty cycle advertisements.

* * * * *